United States Patent
Conrad

(10) Patent No.: US 10,722,089 B2
(45) Date of Patent: Jul. 28, 2020

(54) SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton, Ontario (CA)

(*) Notice: Subject to any disclaimer, the term of this patent is extended or adjusted under 35 U.S.C. 154(b) by 248 days.

(21) Appl. No.: 15/937,333

(22) Filed: Mar. 27, 2018

(65) Prior Publication Data

US 2019/0298133 A1    Oct. 3, 2019

(51) Int. Cl.
    *A47L 9/28*    (2006.01)
    *A47L 5/24*    (2006.01)
    *A47L 9/10*    (2006.01)

(52) U.S. Cl.
    CPC ............ *A47L 9/2836* (2013.01); *A47L 5/24* (2013.01); *A47L 9/10* (2013.01); *A47L 9/2805* (2013.01); *A47L 9/2884* (2013.01)

(58) Field of Classification Search
    CPC ........ A47L 9/2836; A47L 5/24; A47L 9/2805; A47L 9/10; A47L 9/2884; H01M 2/1055; H01M 10/613; H01M 10/6235; H01M 10/6563; H01M 10/63; H01M 10/643; H01M 10/6556; H01M 10/6566; H01M 2220/30
    See application file for complete search history.

(56) References Cited

U.S. PATENT DOCUMENTS

| | | | |
|---|---|---|---|
| 1,871,624 A | 8/1932 | Loewinsohn | |
| 6,457,205 B1* | 10/2002 | Conrad | A47L 5/225 15/319 |
| 7,120,965 B2 | 10/2006 | Hisano et al. | |
| 7,353,565 B2* | 4/2008 | Hisano | A47L 9/00 15/413 |
| 8,475,507 B2 | 7/2013 | Dewey et al. | |
| 8,776,310 B2 | 7/2014 | Genn et al. | |

(Continued)

FOREIGN PATENT DOCUMENTS

| CN | 205671987 U | 11/2016 |
|---|---|---|
| CN | 106343919 A | 1/2017 |

(Continued)

OTHER PUBLICATIONS

TotalPatent: English machine translation of DE102014200663, published on Jul. 31, 2014.

(Continued)

*Primary Examiner* — David Redding
(74) *Attorney, Agent, or Firm* — Philip C. Mendes da Costa; Bereskin & Parr LLP

(57) ABSTRACT

A surface cleaning apparatus has a first air flow path extending from a dirty air inlet to a clean air outlet with a suction motor and an air treatment member positioned in the first air flow path. A second air flow path extends from an ambient air inlet to a secondary air outlet. An energy storage chamber having at least one energy storage member is positioned in the second air flow path. Ambient air can be drawn through the second air flow path to promote cooling of the energy storage members. A fan unit and or a venture can be used to draw ambient air into the second airflow path.

19 Claims, 17 Drawing Sheets

(56) References Cited

U.S. PATENT DOCUMENTS

| | | | |
|---|---|---|---|
| 8,994,339 B1* | 3/2015 | Kam | H02J 7/0029 |
| | | | 320/150 |
| 9,370,285 B2 | 6/2016 | Visel et al. | |
| 2004/0216266 A1* | 11/2004 | Conrad | A47L 5/28 |
| | | | 15/412 |
| 2005/0017681 A1* | 1/2005 | Ogishima | A47L 9/2805 |
| | | | 320/112 |
| 2005/0202310 A1* | 9/2005 | Yahnker | B25F 5/008 |
| | | | 429/62 |
| 2007/0163073 A1 | 7/2007 | Sepke et al. | |
| 2012/0159736 A1* | 6/2012 | Huber | A47L 9/00 |
| | | | 15/339 |
| 2014/0208538 A1 | 7/2014 | Visel et al. | |
| 2017/0035261 A1* | 2/2017 | Lauer | A47L 5/24 |
| 2017/0280950 A1 | 10/2017 | Nam et al. | |
| 2017/0280951 A1 | 10/2017 | Nam et al. | |
| 2017/0280952 A1 | 10/2017 | Nam et al. | |
| 2017/0280959 A1 | 10/2017 | Nam et al. | |
| 2017/0296007 A1 | 10/2017 | Warren et al. | |
| 2017/0296958 A1 | 10/2017 | Nam et al. | |
| 2017/0303754 A1* | 10/2017 | Conrad | A47L 9/1683 |
| 2017/0332860 A1 | 11/2017 | Nam et al. | |
| 2019/0020202 A1* | 1/2019 | Wan | H01M 10/446 |

FOREIGN PATENT DOCUMENTS

| | | |
|---|---|---|
| CN | 106618374 A | 5/2017 |
| CN | 106618375 A | 5/2017 |
| DE | 102014200663 A1 | 7/2014 |
| JP | 2002065535 A | 3/2002 |
| WO | 2014195711 A1 | 12/2014 |
| WO | 2017013391 A1 | 1/2017 |
| WO | 2017013392 A2 | 1/2017 |
| WO | 2017181041 A2 | 10/2017 |

OTHER PUBLICATIONS

TotalPatent: English machine translation of JP2002065535, published on Mar. 5, 2002.
TotalPatent: English machine translation of CN205671987, published on Nov. 9, 2016.
TotalPatent: English machine translation of CN106618375, published on May 10, 2017.
TotalPatent: English machine translation of CN106618374, published on May 10, 2017.
TotalPatent: English machine translation of CN106343919, published on Jan. 25, 2017.

* cited by examiner

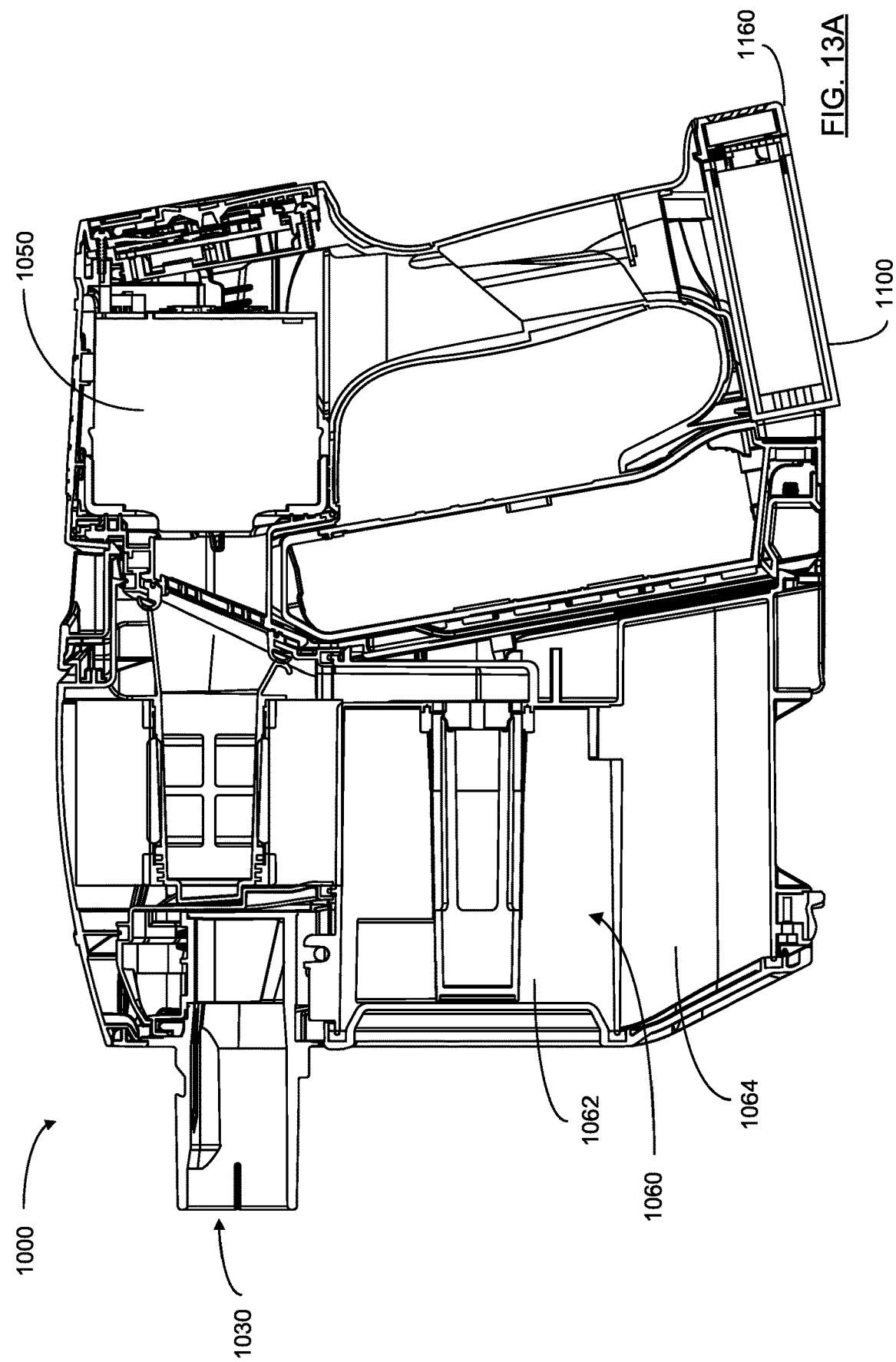

SURFACE CLEANING APPARATUS

FIELD

This disclosure relates generally to surface cleaning apparatus such as hand vacuum cleaners, upright vacuum cleaners, stick vacuum cleaners or canister vacuum cleaners, and in particular portable surface cleaning apparatus, such as hand vacuum cleaners, with onboard energy sources that are air cooled.

INTRODUCTION

The following is not an admission that anything discussed below is part of the prior art or part of the common general knowledge of a person skilled in the art.

Various types of surface cleaning apparatus are known, including upright surface cleaning apparatus, canister surface cleaning apparatus, stick surface cleaning apparatus, central vacuum systems, and hand carriable surface cleaning apparatus such as hand vacuums. Further, various designs for cyclonic surface cleaning apparatus, including battery operated cyclonic hand vacuum cleaners are known in the art.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one aspect of this disclosure, which may be used alone or in combination with any other aspect, a surface cleaning apparatus may have a first or primary airflow path through which dirt laden air travels from a dirty air inlet to a clean air outlet. The first airflow path includes a suction motor and an air treatment member. The surface cleaning apparatus may be powered by an onboard energy source, such as a battery pack or other energy storage member. The energy storage member may include a chemical battery, such as a rechargeable battery. Some batteries, such as lithium-ion batteries, may produce heat while being charged and/or discharged (e.g. while supplying power to an electric motor).

As disclosed herein, a surface cleaning apparatus may also have a second airflow path in which an energy storage chamber is positioned. By drawing ambient air through the second airflow path at or through the chamber in which the energy storage member or members are located, cooling of the energy storage members can be promoted. Using ambient air to cool the energy storage member(s), rather than air exiting a suction motor, may further promote cooling of the energy storage member since the ambient air may be cooler than exhaust air that has passed through or by the suction motor.

In addition, air exiting the suction motor may contain entrained dirt (e.g., carbon from the suction motor or dirt that was not removed by the air treatment member because, inter alia, the user removed a pre-motor filter). The dirt particles may become trapped in the airflow path and/or energy storage chamber, reducing the volume of the air channel available for cooling air to flow through and/or coating the batteries and thereby acting as insulation to reduce the heat transfer from the batteries to air flowing past the batteries. Using ambient air to cool the energy storage member(s) may reduce clogging of the cooling airflow channels around the energy storage member(s) to provide effective cooling for a longer period of time.

An additional fan unit may be provided in the second air flow path thereby enable the energy storage members to be cooled more effectively by drawing in additional ambient air. This may decrease damage that may occur to the energy storage members because of excessive heating during use and/or charging, resulting in a longer usable timespan for the hand vacuum clean between charges. The increased efficiency may also result in a longer lifespan of the energy storage members.

In accordance with this broad aspect, there is provided a surface cleaning apparatus having a front end, a rear end, an upper end, a lower end, and first and second laterally spaced apart sides, and comprising:

(a) a first air flow path extending from a dirty air inlet to a clean air outlet;
(b) an air treatment member positioned in the air flow path and having an air treatment member air inlet and an air treatment member air outlet;
(c) a suction motor positioned in the air flow path upstream of the clean air outlet;
(d) a second air flow path extending from an ambient air inlet to a secondary air outlet;
(e) an energy storage chamber having at least one energy storage member wherein the energy storage chamber is positioned in the second air flow path; and,
(f) a fan unit positioned in the second air flow path upstream of the secondary air outlet,
wherein, in operation, the fan unit draws ambient air into the second air flow path via the ambient air inlet.

In any embodiment, the second airflow path may be fluidically isolated from the first airflow path.

In any embodiment, the energy storage chamber may be thermally isolated from the first airflow path.

In any embodiment, the surface cleaning apparatus may comprise a control system capable of detecting an operating condition of the surface cleaning apparatus and then selectively activating the fan unit based on the operating condition. The operating condition may be a charging status of the at least one energy storage member, and the control system may be operable to activate the fan unit when the at least one energy storage member is charging. Alternately, or in addition, the operating condition may be an operational status of the surface cleaning apparatus, and the control system may be operable to activate the fan unit when the suction motor is actuated.

In any embodiment having a control system, the operating condition may be a temperature of the at least one energy storage member, and the control system may be operable to activate the fan unit when the temperature of the at least one storage member exceeds a predefined threshold temperature.

In any embodiment having a control system, the surface cleaning apparatus may comprise a temperature sensor positioned to measure a temperature of the at least one energy storage member, and the control system may be operable to activate the fan unit when the measured temperature exceeds a predefined threshold temperature.

In any embodiment, the surface cleaning apparatus may comprise a filter positioned in the second airflow path at the ambient air inlet.

In any embodiment, the surface cleaning apparatus may comprise a control system capable of controlling an operating condition of the surface cleaning apparatus, wherein the control system is in fluid contact with the second airflow path.

In any embodiment, the surface cleaning apparatus may comprise a main body and the energy storage chamber may be removably mounted to the main body; the energy storage chamber may comprises a moveable portion having an engagement member, the engagement member being moveable between a locked position and an unlocked position, wherein when the energy storage chamber is mounted to the main body and the engagement member is in the locked position the engagement member prevents the energy storage chamber being removed from the main body and when the energy storage chamber is in mounted to the main body and the engagement member is in the unlocked position the energy storage member is removable from the main body; and, the moveable portion may define a fan unit housing enclosing the fan unit.

In any embodiment, the energy storage chamber may comprise a moveable portion that defines a fan unit housing enclosing the fan unit.

In any embodiment, an exterior surface of the at least one energy storage member may be free of an electrically insulating coating.

In any embodiment, the energy storage chamber may comprise a housing manufactured of a thermally conductive plastic.

In any embodiment, the energy storage chamber may comprise a housing defining an outer perimeter of the energy storage chamber; the energy storage chamber may have a dovetail recess that is recessed inward of the outer perimeter of the energy storage chamber; and the energy storage chamber is mountable to a main body of the surface cleaning apparatus by the dovetail recess.

In accordance with another aspect of this disclosure, which may be used alone or in combination with any other aspect, it may be desirable for the energy storage members to be cooled using ambient air without the need for an additional fan unit. This may reduce or eliminate power drawn by the fan unit to further increase the battery efficiency. Omitting the fan unit could also provide a reduced overall weight for the surface cleaning apparatus, for example, so it can be more easily carried by a user while cleaning one or more surfaces. For example, air may be drawn through the energy storage chamber using a venture. Accordingly, when the suction motor is actuated, the airflow created by the suction motor will cause air to be drawn through a second airflow path through the energy storage chamber via the venture.

In accordance with this broad aspect, there is provided a surface cleaning apparatus having a front end, a rear end, an upper end, a lower end, and first and second laterally spaced apart sides, and comprising:
  (a) a first airflow path extending from a dirty air inlet to a clean air outlet;
  (b) an air treatment member positioned in the airflow path and having an air treatment member air inlet and an air treatment member air outlet;
  (c) a suction motor positioned in the airflow path upstream of the clean air outlet;
  (d) a second airflow path extending from an ambient air inlet to a secondary air outlet;
  (e) an energy storage chamber having at least one energy storage member wherein the energy storage chamber is positioned in the second air flow path; and,
  (f) a venturi connecting the first and second airflow paths whereby airflow through the first airflow path draws air through the second air flow path.

In any embodiment, the secondary air outlet may be positioned downstream of the at least one energy storage member.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 13A is a cross-section view of the hand vacuum cleaner of FIG. 1, taken along line 13-13 in FIG. 1;

Figure 1:
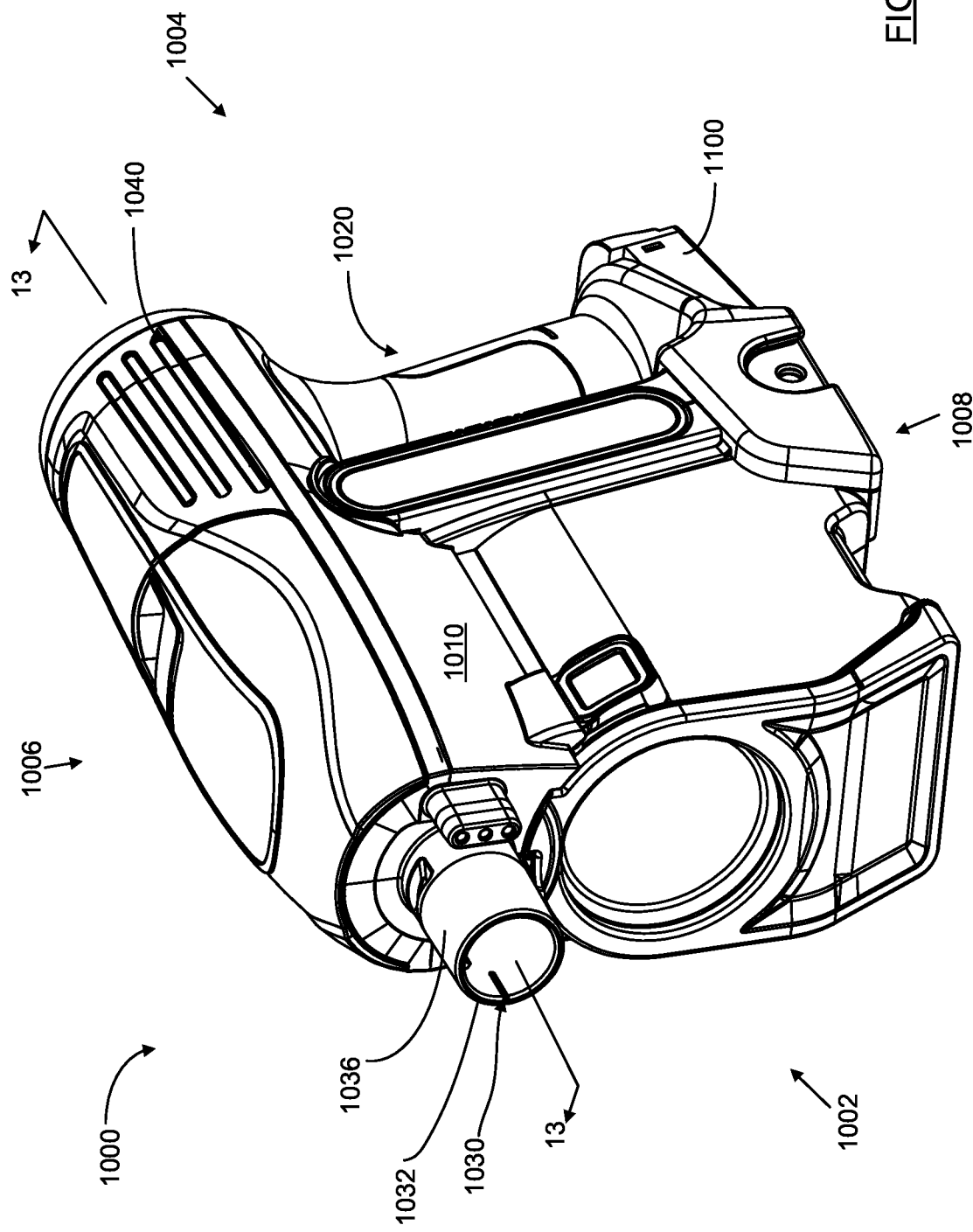
FIG. 1 is a top front perspective view of a hand vacuum cleaner in accordance with an embodiment.
Figure 2:
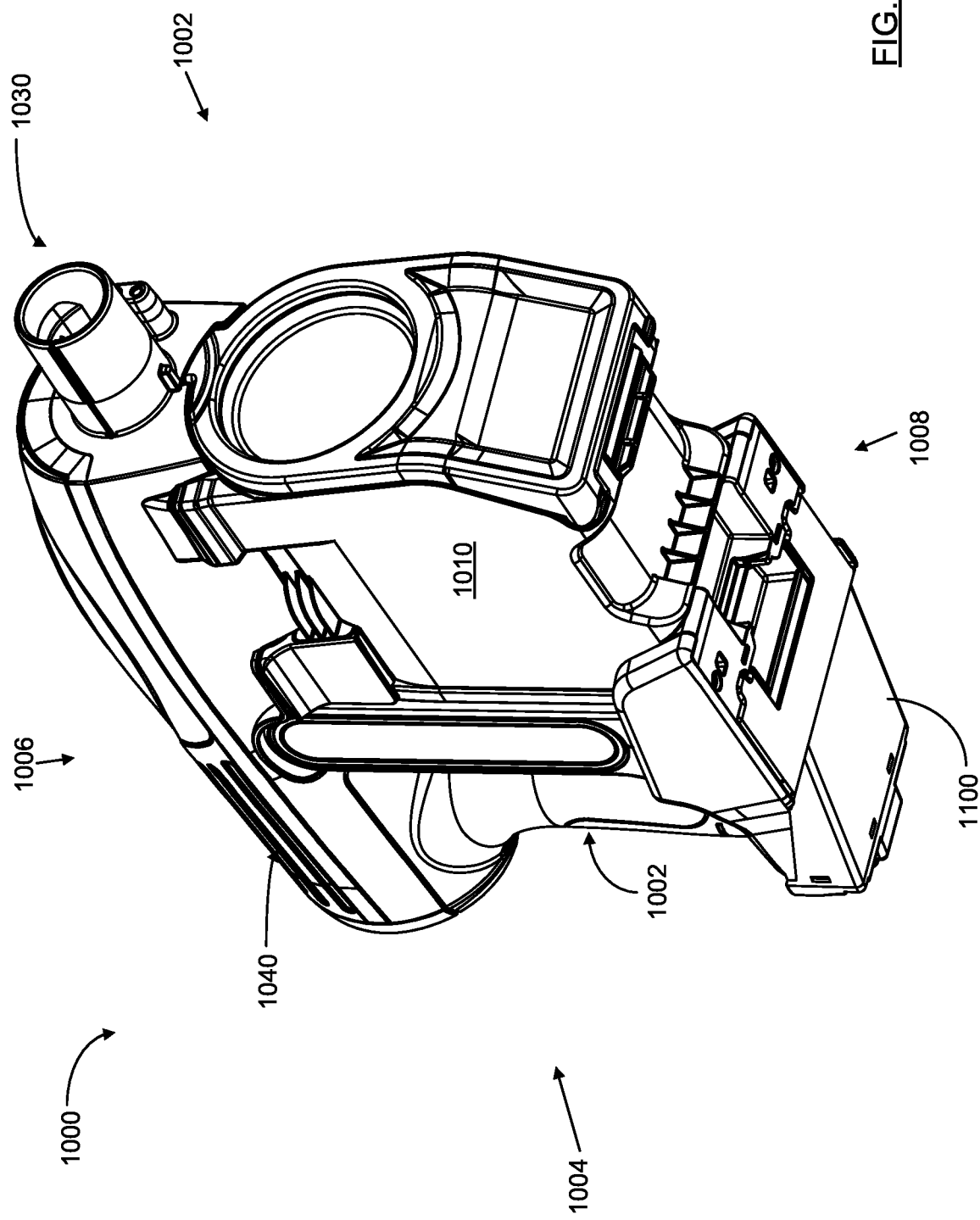
FIG. 2 is a bottom front perspective view of the hand vacuum cleaner of FIG. 1.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

Referring to FIGS. 1 to 5 and 13, an exemplary embodiment of a surface cleaning apparatus is shown generally as 1000. The surface cleaning apparatus shown includes a secondary airflow path in through which ambient air is drawn to cool an energy storage chamber 1100.

In the illustrated embodiment, the surface cleaning apparatus is a hand vacuum cleaner, which may also be referred to also as a "handvac" or "hand-held vacuum cleaner". As used herein, a hand vacuum cleaner is a vacuum cleaner that can be operated to clean a surface generally one-handedly. That is, the entire weight of the vacuum may be held by the same one hand used to direct a dirty air inlet of the vacuum cleaner with respect to a surface to be cleaned. For example, the handle and a clean air inlet may be rigidly coupled to each other (directly or indirectly) so as to move as one while maintaining a constant orientation relative to each other. This is to be contrasted with canister and upright vacuum cleaners, whose weight is typically supported by a surface (e.g. a floor) during use. It will be appreciated that surface cleaning apparatus 1000 may alternately be any surface cleaning apparatus, such as an upright surface cleaning apparatus, a stick vac, a canister surface cleaning apparatus, an extractor or the like. It will also be appreciated that the surface cleaning apparatus may use any configuration of the operating components and the airflow paths exemplified herein.

As exemplified in FIGS. 1 to 5 and 13, surface cleaning apparatus 1000 includes a main body 1010 having a housing, a handle 1020, an air treatment member 1060 connected to the main body 1010, a dirty air inlet 1030, a clean air outlet 1040, and an air flow path extending between the dirty air inlet and the clean air outlet, which may be referred to as a first or primary air flow path.

Surface cleaning apparatus 1000 has a front end 1002, a rear end 1004, an upper end or top 1006, and a lower end or bottom 1008. In the embodiment shown, dirty air inlet 1030 is at an upper portion of the front end 1002 and clean air outlet 1040 is at an upper portion of the rear end 1004. It will be appreciated that the dirty air inlet 1030 and the clean air outlet 1040 may be provided in different locations.

A suction motor 1050 is provided to generate vacuum suction through the first air flow path. In some embodiments, the suction motor 1050 is positioned downstream from the air treatment member 1060, although it may be positioned upstream of the air treatment member 1060 (e.g., a dirty air motor) in alternative embodiments.

The air treatment member 1060 is configured to remove particles of dirt and other debris from the airflow and/or otherwise treat the airflow. Any air treatment member or members known in the art may be used. For example, the surface cleaning apparatus may use one or more cyclones, bags, screens, physical filter media (e.g., foam, felt, HEPA) or the like.

As exemplified, the air treatment member 1060 comprises a cyclone assembly having a single cyclonic cleaning stage with a single cyclone chamber 1062 and a dirt collection region 1064 external to the cyclone chamber. The cyclone chamber 1062 and dirt collection region 1064 may be of any configuration suitable for separating dirt from an air stream and collecting the separated dirt, respectively. The cyclone chamber 1062 may be oriented in any direction.

In alternative embodiments, the cyclone assembly may include two or more cyclonic cleaning stages arranged in series with each other. Each cyclonic cleaning stage may include one or more cyclone chambers (arranged in parallel or series with each other) and one or more dirt collection chambers, of any suitable configuration. The dirt collection chamber or chambers may be external to the cyclone chambers, or may be internal the cyclone chamber and configured as a dirt collection area or region within the cyclone chamber.

In the illustrated embodiment, the dirty air inlet 1030 of the hand vacuum cleaner 1000 is the inlet end 1032 of an inlet conduit 1036. Optionally, inlet end 1032 of the conduit 1036 can be used as a nozzle to directly clean a surface. Alternatively, or in addition to functioning as a nozzle, inlet conduit 1036 may be connected or directly connected to the downstream end of any suitable accessory tool such as a rigid air flow conduit (e.g., an above floor cleaning wand), a crevice tool, a mini brush, and the like.

As exemplified, power may be supplied to the suction motor 1050 and other electrical components of the hand vacuum cleaner 1000 from an onboard energy storage member which may include, for example, one or more batteries 1150 or other energy storage device. In the illustrated embodiment, the hand vacuum cleaner 1000 includes an energy storage chamber 1100.

A power switch 1070 may be provided to selectively control the operation of the suction motor (e.g. either on/off or variable power levels or both), for example by establishing a power connection between the batteries 1150 and the suction motor 1050. The power switch 1070 may be provided in any suitable configuration and location, including a button, rotary switch, sliding switch, trigger-type actuator and the like.

The hand vacuum cleaner also includes a clean air outlet at the outlet end of the airflow path. The clean air outlet may be located at any position on the surface cleaning apparatus. As exemplified, air may exit the hand vacuum cleaner 1000 via a grill located in an upper portion of the main body (e.g., via an air outlet 1040 provided in the rear end of the main body or a sidewall adjacent the rear end). Alternately, air may exit through a lower portion of the main body. This may be achieved by conveying the air downwardly through the handle 1020 of the hand vacuum cleaner. Accordingly, at least a portion of the air flow path between the dirty air inlet 1030 and the clean air outlet may flow through the handle 1020. This may help facilitate a variety of different air flow path configurations and clean air outlet 1040 locations.

In embodiments herein, the hand vacuum cleaner 1000 can also include a second air flow path. The second airflow path may direct or enable a flow of ambient air towards (or through) the energy storage chamber 1100 containing the onboard energy storage members 1150. Ambient air is air other than that which is passing through the primary airflow path, e.g., air drawn in from the exterior of the surface cleaning apparatus. Some energy storage members, such as lithium-ion batteries, may produce heat while being charged and/or discharged (e.g. while supplying power to an electric motor). The ambient air drawn through the second air flow path can promote cooling of the energy storage members 1150.

In some embodiments of hand vacuum cleaner 1100, the second air flow path may be fluidically isolated from the first air flow path. Accordingly, the hand vacuum cleaner 1100 may have separate exhaust outlets for the first air flow path and the second air flow path. Air flowing through the first airflow path can be heated as it passes through the first airflow path by the suction motor 1050. By isolating the second air flow path, the ambient air that is used to cool the energy storage members 1150 may not be heated by the air from the first air flow path.

Optionally, the second airflow path may also be positioned in the hand vacuum cleaner 1000 so as to be separated from or spaced from the first airflow path to thermally isolate the first and second air flow paths. This may further ensure that the heated air from the first airflow path does not heat the ambient air flowing through the second airflow path.

Optionally, at least a portion of the first and second airflow paths may be positioned adjacent or touching each other but they may be separated by a thermally insulating material.

Similarly, the energy storage chamber 1100 can be positioned in the hand vacuum cleaner 1000 at a location separated from the first airflow path. The energy storage chamber 1100 may be thermally isolated from the first air flow path to prevent the heated air from the first air flow path from heating the energy storage chamber 1100, and in turn the batteries 1150.

As exemplified, the energy storage chamber 1100 is mounted to a lower rear portion of the main body 1010. Similarly, the second airflow path is positioned in the lower rear portion of the main body 1010. Accordingly, both the energy storage chamber 1100 and the second airflow path may be isolated from the first airflow path.

Alternatively, the first air flow path may pass near to one or both of the energy storage chamber 1100 and the second air flow path. For example, the first air flow path may exit through a lower portion of the main body 1010. In such cases, the first airflow path may come into thermal contact with one or both of the energy storage chamber 1100 and the second airflow path when they are also positioned in the lower portion of the main body 1010. In such cases, a thermal barrier (e.g., a thermal insulating material) may be provided between the airflow paths.

FIGS. 6 to 12 illustrate an exemplary embodiment of the energy storage chamber 1100. In the example illustrated, the second air flow path is defined by the energy storage chamber 1100. Accordingly, the energy storage chamber 1100 has both the air inlet to and the air outlet from the second air flow path.

Alternatively, the second airflow path may be defined at least in part by the main body 1010 of the hand vacuum cleaner. Accordingly, the second air flow path may include portions that pass through the main body 1010 and the energy storage chamber 1100. Accordingly, the air inlet to and/or the air outlet from the second airflow path may be part of the main body 1010. In such an embodiment, the portion of the second airflow path in the energy storage chamber may be connected to the portion of the second airflow path in the main body when the energy storage member is present in the main body. For example, if the energy storage chamber is removably mounted to the main body, a gasket or the like may be provided to provide an airtight seal between the portions of the second airflow paths.

The second airflow path generally extends from an ambient air inlet 1130 to a secondary air outlet 1140. In the example shown, the second air flow path passes through the interior 1128 of the energy storage chamber 1100. This may promote cooling of the batteries 1150 through direct contact with ambient air flowing through the second air flow path.

Alternatively, the second air flow path may not enter the energy storage chamber 1100. Instead, the energy storage chamber 1150 may be positioned in the second air flow path and the second air flow path may direct airflow at or along one or more walls of the energy storage chamber 1150. By directing a stream of air directly at, or at an angle to, a wall of the energy storage chamber 1150, any boundary layer of air (which may act as an insulator) or laminar flow along a wall of the battery chamber 1150 is disrupted, thereby enabling enhanced cooling. In such a case, it will be appreciated that the exterior surface of the energy storage chamber may be provided with cooling fins.

Optionally, operating components of the hand vacuum cleaner 1000 may be positioned in fluid contact with the second airflow path. This may also allow at least some of the ambient air being drawn into the hand vacuum cleaner 1000 to flow over, and optionally help cool, operating components that are located in contact with the second air flow path. Examples of such components may include controllers, circuit boards, other internal electronics and the like. One example of such electronics can include a printed circuit board (PCB) provided to control optional information display device and/or power switch. Optionally, the operating component may be in a housing and the air may flow over the housing. In such a case, it will be appreciated that the exterior surface of the housing may be provided with cooling fins.

Optionally, a filter may be positioned in the second airflow path upstream of the energy storage chamber. For example, the filter may be positioned at the ambient air inlet. The filter may prevent dirt and debris entrained in the ambient air from entering the second air flow path and/or energy storage chamber and potentially clogging air channels therethrough. The filter may be any suitable type of filter such as a foam filter, felt filter, HEPA filter, other physical filter media, electrostatic filter, and the like.

The energy storage chamber 1100 has a housing 1120 that includes a main body 1122 and an optional front portion 1170. The housing 1120 may define an interior 1128 of the energy storage chamber 1100. The front portion 1170 may be mounted to the main body 1122 to retain the batteries 1150 within the interior 1128 of the energy storage chamber 1100.

Optionally, energy storage chamber 1100 may be openable. In accordance with such an embodiment, the front portion 1170 may be removably or moveably (e.g., pivotally) mounted to the main body 1122. A lock may be provided to enable the front portion to be opened. The lock may comprise first and second engagement members provided on the front portion and the remainder of the energy storage chamber 1100. As exemplified, the front portion 1170 can include protruding members or tabs 1178 that engage grooves 1180 in the main body 1122 of the housing. The tabs 1178 and grooves 1180 may provide a friction fit securing the front portion 1170 to the main body 1122. In order to disengage the front portion 1170 from the main body 1122, the protrusions 1178 can be depressed so they no longer engage the grooves 1180. The front portion 1170 may then be removed from the main body 1122. This may provide access to the interior 1128 of the energy storage chamber 1100, e.g. to replace or recycle the batteries 1150. Alternately, any other portion of the energy storage chamber may be openable.

Alternatively, the energy storage chamber may not be openable, e.g., the front portion 1170 may be fixed to the main body 1122. The energy storage chamber 1100 may then be discarded as a unit.

One or more energy storage members 1150 can be retained in the interior 1128 of the chamber 1100. The energy storage members 1150 function as onboard power sources for the hand vacuum cleaner 1000. In general, the power sources may be any suitable device, including, for example one or more batteries. Optionally, the batteries may be rechargeable or may be replaceable, non-rechargeable batteries.

Optionally, power may be supplied to the hand vacuum cleaner 1000 by an electrical cord connected to the hand vacuum cleaner 1000 (not shown) that can be connected to a standard wall electrical outlet. The power from the electrical cord may also serve to recharge the batteries 1150. In some instances, the batteries 1150 may be recharged while the vacuum cleaner 1000 is operational.

The energy storage chamber 1100 may include any suitable number of energy storage members 1150, and may include, for example, lithium ion battery cells. Any number of cells may be used to create a power source having a desired voltage and current, and any type of battery may be used, including NiMH, alkaline, and the like. Energy storage chamber 1100, which may be referred to as a battery pack, may be electrically connected to the hand vacuum cleaner 1000 by any means known in the art.

The battery pack 1100 may have a power coupling for supplying power (e.g. charging) the cells 1150. Any suitable power coupling may be used, for example, a female coupling configured to receive a male coupling of an electrical cord that is connectable to a source of AC or DC power, such as a household power socket.

The interior 1128 of the battery pack 1100 may include alignment members to maintain the batteries 1150 in place in the interior 1128. A plurality of ribs 1154 may extend or project from the inner sidewalls 1156 of the housing 1120. The ribs 1154 can define battery-receiving regions 1158 of the battery pack 1100. The ribs may extend in the direction of flow through the energy storage chamber.

Each battery-receiving region 1158 can be shaped to receive a single battery cell 1150. The ribs 1154 can align the batteries 1150 within the energy storage chamber 1100 and retain the batteries 1150 in place. Optionally, the batteries 1150 may be spot-welded to the ribs 1154 to secure the batteries 1150 in place.

The ribs 1154 can also define a plurality of air channels 1152 for the battery pack 1100. The air channels 1152 can extend along the batteries 1150 when the batteries 1150 are positioned in the battery pack 1100. Air entering the ambient air inlet 1130 can pass through the air channels 1152 and contact the exterior surface of the batteries 1150 to promote cooling of the batteries 1150.

In the example illustrated, the air channels 1152 extend axially along the length of the batteries 1150. This may expose a large area of the surface of the batteries 1150 to the ambient air flowing through the second air flow path. In general, the air channels 1152 may be provided in any suitable configuration and location within the energy storage chamber 1100, for instance extending laterally across the batteries 1150.

The housing 1120 of the energy storage chamber 1100 may include electrically insulating members that enclose the batteries 1150. For example, the housing 1120 itself may be manufactured of electrically insulating materials such as plastic. This may electrically insulate the batteries 1150 within the energy storage chamber 1100.

In some cases, the housing 1120 may be thermally conductive. A thermally conductive housing 1120 permits heat transfer between the interior 1128 of the energy storage chamber 1100 and ambient air outside the hand vacuum cleaner 1100. This may further promote cooling of the batteries 1150.

The housing 1120 may be manufactured of plastics that are both electrically insulative and thermally conductive. This may protect the batteries 1150 from unwanted electrical contacts while facilitating cooling.

The ribs 1154 holding the batteries 1150 in place within the housing 1120 can also ensure that the batteries 1150 remain separated from one another. The ribs 1154 may thus isolate the individual battery cells 1150 and ensure there is no direct electrical contact between the battery cells 1150. This may allow the bare metal casing of the batteries 1150 to be exposed when positioned in the energy storage chamber 1100. In other words, the exterior surface of the batteries 1150 positioned in the energy storage chamber 1100 may be free of any electrically insulative coatings.

Electrically insulative coatings may serve to thermally insulate the batteries 1150. By exposing the bare metal casing of the batteries 1150 to air flowing through the second air flow path (i.e. through air flow channels 1152) the heat transfer between the batteries 1150 and the ambient air may be improved. Therefore, using an energy storage chamber that enables the batteries to be uncoated may assist in cooling the batteries.

Optionally, one or more thermally conductive heat transfer members may be positioned to contact the batteries 1150. The heat transfer members may act as heat sinks for the batteries 1150. The heat transfer member may be manufactured of any suitable thermally conductive material, such as metal.

In some embodiments, the hand vacuum cleaner 1100 may include a fan unit in the second air flow path. The fan unit can be operated to draw ambient air into the second airflow path via the ambient air inlet 1130.

In the example illustrated, the fan unit 1174 is provided by the battery pack 1100. Alternatively, the fan unit 1174 may be separate from the battery pack 1100. For example, if the second airflow path extends through a portion of the main body, then the fan unit 174 may be provided in the main body.

The fan unit 1174 may be positioned at any location upstream of the secondary air outlet 1140 and is preferably downstream of the energy storage members.

Providing the hand vacuum cleaner 1100 with a fan unit 1174 in addition to the suction motor positioned in the first airflow path may increase the weight of the hand vacuum cleaner 1100. However, operation of the fan unit 1174 ensures that more ambient air is drawn through the second air flow path to promote cooling of the batteries 1150.

Cooling the batteries can reduce or prevent damage to the batteries from overheating during charging and/or discharging. The can provide a longer usable timespan for the hand vacuum cleaner 1100 between recharge or replacement of the batteries 1150. Additionally, this may also extend the overall usable lifespan of rechargeable batteries 1150 by reducing the number of battery discharge cycles.

The fan unit 1174 can be powered by the batteries 1150 in the battery pack 1100. As a result, the fan unit 1174 may increase the power drawn from the batteries 1150 while it is operational. Nonetheless, the increased efficiency of the batteries 1150 because of ambient air-cooling will typically be greater than the power required by the fan unit 1174. The fan unit may be similar to those used to cool a CPU of a computer or the like. As such, the fan unit may draw little power and may not noticeably effect the operational time of a surface cleaning apparatus on a single battery charge.

In some embodiments, the fan unit 1174 may be activated when the vacuum cleaner 1100 is powered on. Alternatively or in addition, the fan unit 1174 may be selectively activated based on the operating conditions of the vacuum cleaner 1100. Selectively activating the fan unit 1174 may reduce the amount of power drawn from the batteries 1150 by operation of the fan unit 1174.

The hand vacuum cleaner 1100 may include a controller or control system that can monitor and detect one or more operating conditions of the vacuum cleaner 1100. The control system may activate or deactivate the fan unit 1174 based on the one or more operating conditions detected. The control system may also adjust the rate or rotation of the fan unit, e.g., the power supplied to the fan unit, based on the operating conditions of the hand vacuum cleaner 1100.

Batteries 1150 may tend to heat up when being charged or discharged. Accordingly, the fan unit 1174 may be activated to promote the cooling of the batteries 1150 during operations where the batteries 1150 are expected to heat up.

In some cases, the fan unit 1174 may be activated based on a charging status of the batteries 1150 in the energy storage chamber 1100. For example, the fan unit 1174 may be activated when the batteries 1150 are being charged.

In some cases, the fan unit 1174 may be activated when the batteries 1150 are being discharged. For example, the control system may determine that the hand vacuum cleaner is performing a cleaning operation (e.g., the control system may determine that the suction motor 1050 has been actuated). The control system may then activate the fan unit 1174 when the suction motor 1050 is active. When the temperature of the batteries 1150 increases, the battery efficiency may decrease. Accordingly, activating the fan unit 1174 when the batteries are being discharged may prolong the discharge period for a single charge.

In some cases, the fan unit 1174 may only be activated when certain operational parameters are met. Rather than activating the fan unit 1174 any time the batteries 11550 are discharging or charging, the control system may detect an operational condition of the vacuum cleaner 1000 indicating that cooling of the batteries 1150 is desired.

In some cases, a surface cleaning apparatus may have different operating modes (e.g., a low power mode wherein the suction motor is operated on a low power draw from the batteries and a high power mode wherein the suction motor is operated on a high power draw from the batteries). The fan unit 1174 may not be activated when the batteries 1150 are discharging slowly (e.g., when the surface cleaning apparatus is operating on a low power mode that draws a reduced amount of current from the batteries). Instead, the fan unit may be actuated only when the surface cleaning apparatus is operated at a high power mode, which draws more power from the batteries 1150 than the lower power mode.

In some cases, the fan unit 1174 may not be activated until the batteries 1150 reach a predefined threshold temperature. By waiting to activate the fan unit 1174 until the batteries 1150 reach a predefined temperature, the power drawn by the fan unit 1174 may be further reduced. The hand vacuum cleaner 1000 may include a temperature sensor (not shown) positioned to sense the temperature of the energy storage members 1150 (directly or based on temperature of the energy storage chamber 1100). The control system may activate the fan unit 1174 when the sensor measures a temperature that exceeds the predefined threshold temperature.

For example, where the hand vacuum cleaner 1000 is only briefly activated the batteries 1150 may not reach a temperature at which performance begins to degrade. Accordingly, activating the fan unit 1174 in such cases may draw more power from the batteries 1150 than necessary. By waiting until the batteries 1150 have begun to heat up, the fan unit 1174 can still perform the cooling function without unnecessarily drawing power.

In some cases, the fan unit may be deactivated when a predefined threshold temperature is reached. For example, when the batteries have cooled sufficiently, the fan unit may be deactivated.

In some embodiments, the fan unit 1174 may be omitted. Omitting the fan unit 1174 may reduce the weight of the hand vacuum cleaner 1000 which may improve user maneuverability.

Figure 14:
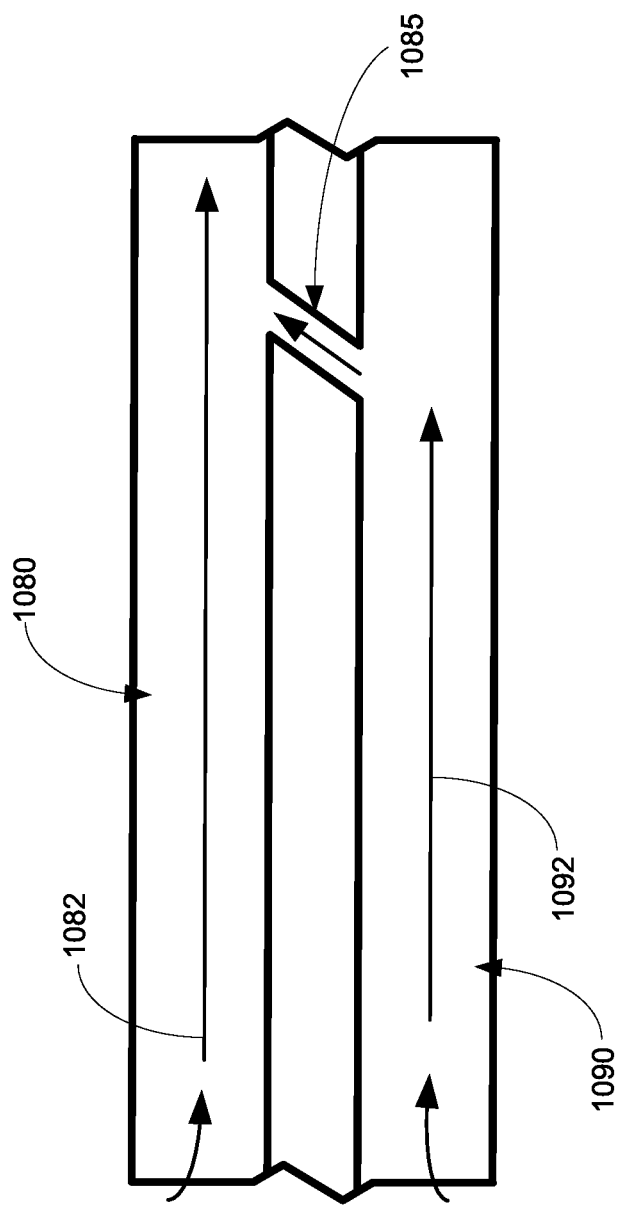
FIG. 14 is a partial schematic view of a conduit connecting the first and second air flow paths.

In embodiments omitting the fan unit 1174, airflow through the first airflow path may be used to induce airflow through the second airflow path. For example, a conduit 1085 may extend between the first airflow path 1080 and the second airflow path 1090 (see FIG. 14). The conduit 1085 may create venturi suction through the second airflow path 1090 to induce ambient air to travel through the second airflow path. This induced air flow 1092 may then be used to cool the energy storage members 1150 and/or operating components of the hand vacuum cleaner 1000.

When the energy storage chamber 1100 (and second air flow path 1090) is positioned at the bottom rear of the hand vacuum cleaner 1000 as exemplified, the first air flow path 1080 may be configured to include a section that also flows through or near the bottom rear of the hand vacuum cleaner 1000. At least a portion of the air flow path between the dirty air inlet 1030 and the clean air outlet 1040 may flow through the handle 1020. This may help facilitate a variety of different air flow path configurations and clean air outlet 1040 locations proximate the energy storage chamber 1100. This may also allow at least some of the air being exhausted by the suction motor 1050 to flow over the conduit 1085 that extends from the second airflow path 1090 to generate the venturi suction.

The second air flow path 1090 may still pass through, or contact, the energy storage chamber 1100. However, rather than being fluidically isolated from the first air flow path 1080, a conduit 1085 can extend from the second air flow path 1090 towards to the first air flow path 1080. The conduit 1085 may have a first end contacting the second air flow path 1090 and a second end contacting the first air flow path 1080. As air 1082 in the first air flow path 1080 flows across the second end of the conduit 1085, air can be drawn from the second air flow path 1090 towards the first air flow path 1080. In turn, the low pressure region in the second air flow path 1090 that results can draw ambient air in through the ambient air inlet.

The second end of the conduit 1085 can be arranged to be downstream from the first end of the conduit 1085. That is, the conduit 1085 may have a conduit axis that forms an angle of at most 90 degrees with the direction of air flow 1082 through the first air flow path 1080. This may inhibit air from the first air flow path 1080 from entering the second air flow path 1090 via the conduit 1085.

The first end of the conduit 1085 can be positioned to contact the second airflow path 1090 downstream of the energy storage members or downstream of the energy storage chamber 1100. This may ensure that any air from the first air flow path 1080 that might enter the second air flow path 1090 through the conduit 1085 does not enter the energy storage chamber 1100. This may also reduce any heat transfer from the heated exhaust air 1082 flowing through the first air flow path 1080 to the ambient air 1092 that is cooling the energy storage chamber 1100.

In some embodiments, a fan unit 1174 may be employed along with a venturi conduit 1085. This may be particularly advantageous, for example, where the fan unit 1174 is only activated once the batteries 1150 reach a predefined temperature. Prior to the batteries 1150 reaching the predefined temperature, ambient air may still be drawn through the second air flow path 1090 to cool the energy storage members 1150 by operation of the Venturi suction. This induced ambient air flow may prolong the operational period prior to the batteries 1150 reaching the predefined temperature threshold. Once the batteries 1150 are heated to the predefined temperature, the fan unit 1174 can then be activated to increase the volume of ambient air being drawn through the second air flow path 1090.

Figure 3:
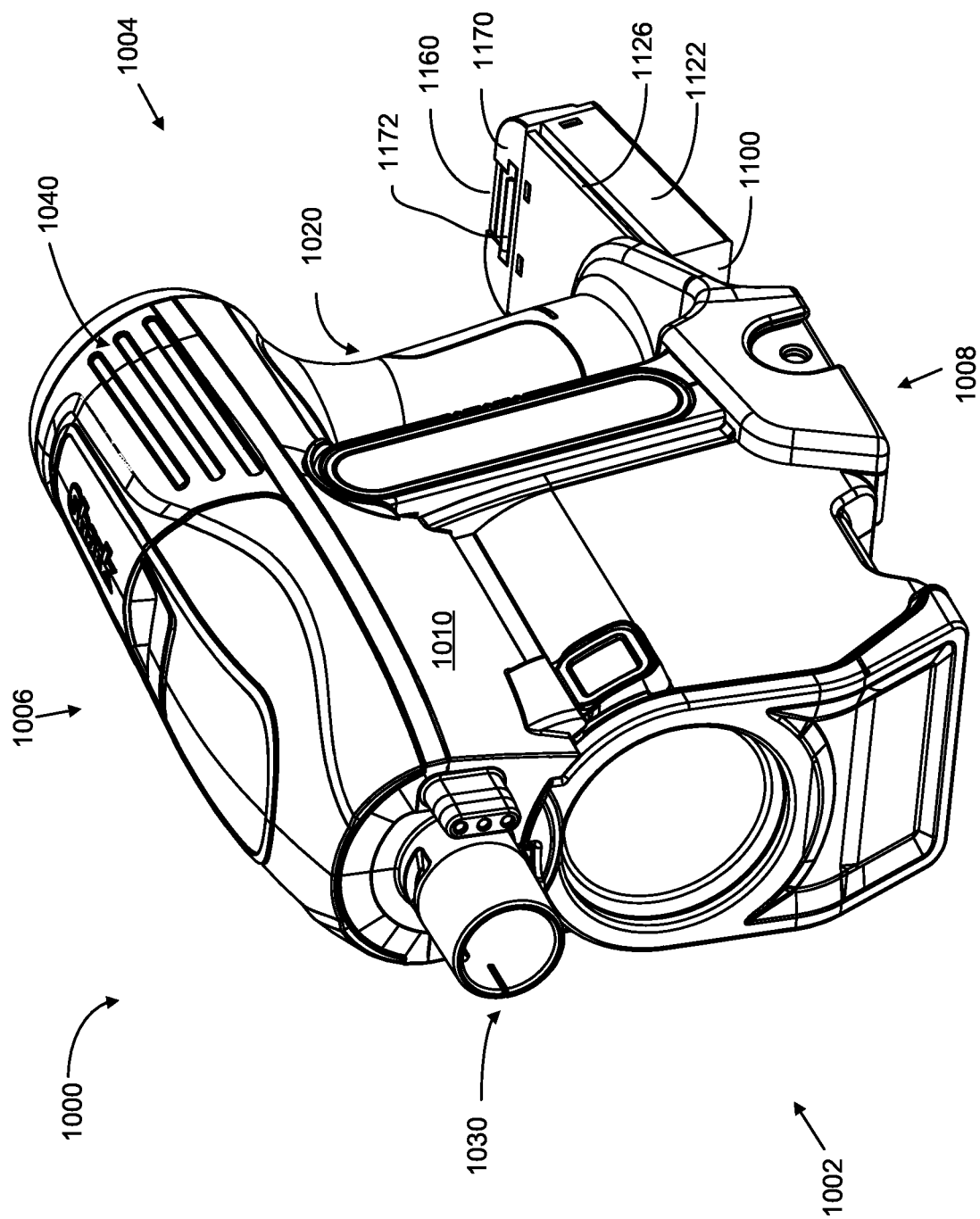
FIG. 3 is a top front perspective view of the hand vacuum cleaner of FIG. 1 with an energy storage chamber partially removed.
Figure 4:
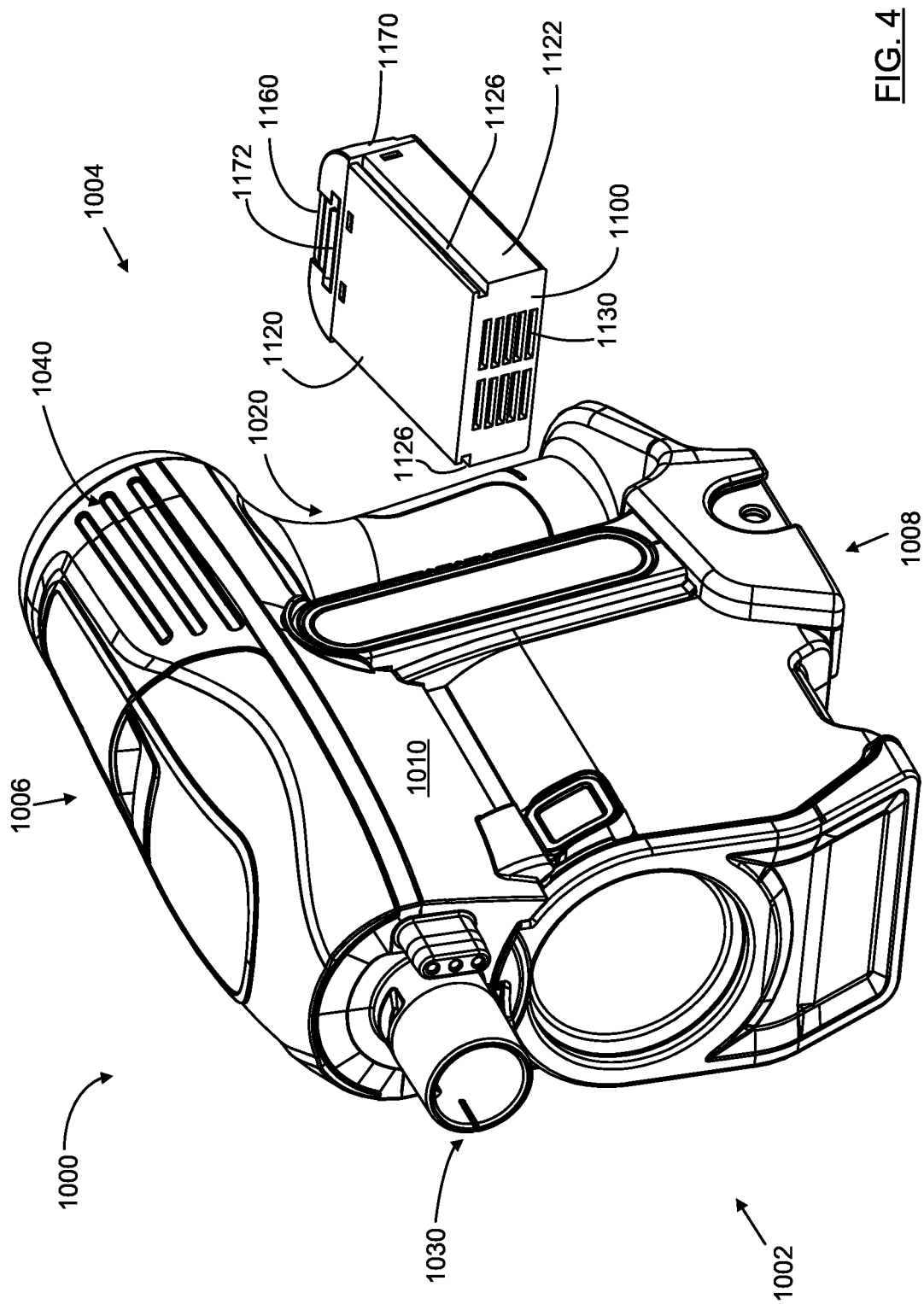
FIG. 4 is a top front perspective view of the hand vacuum cleaner of FIG. 1 with the energy storage chamber fully removed.
Figure 5:
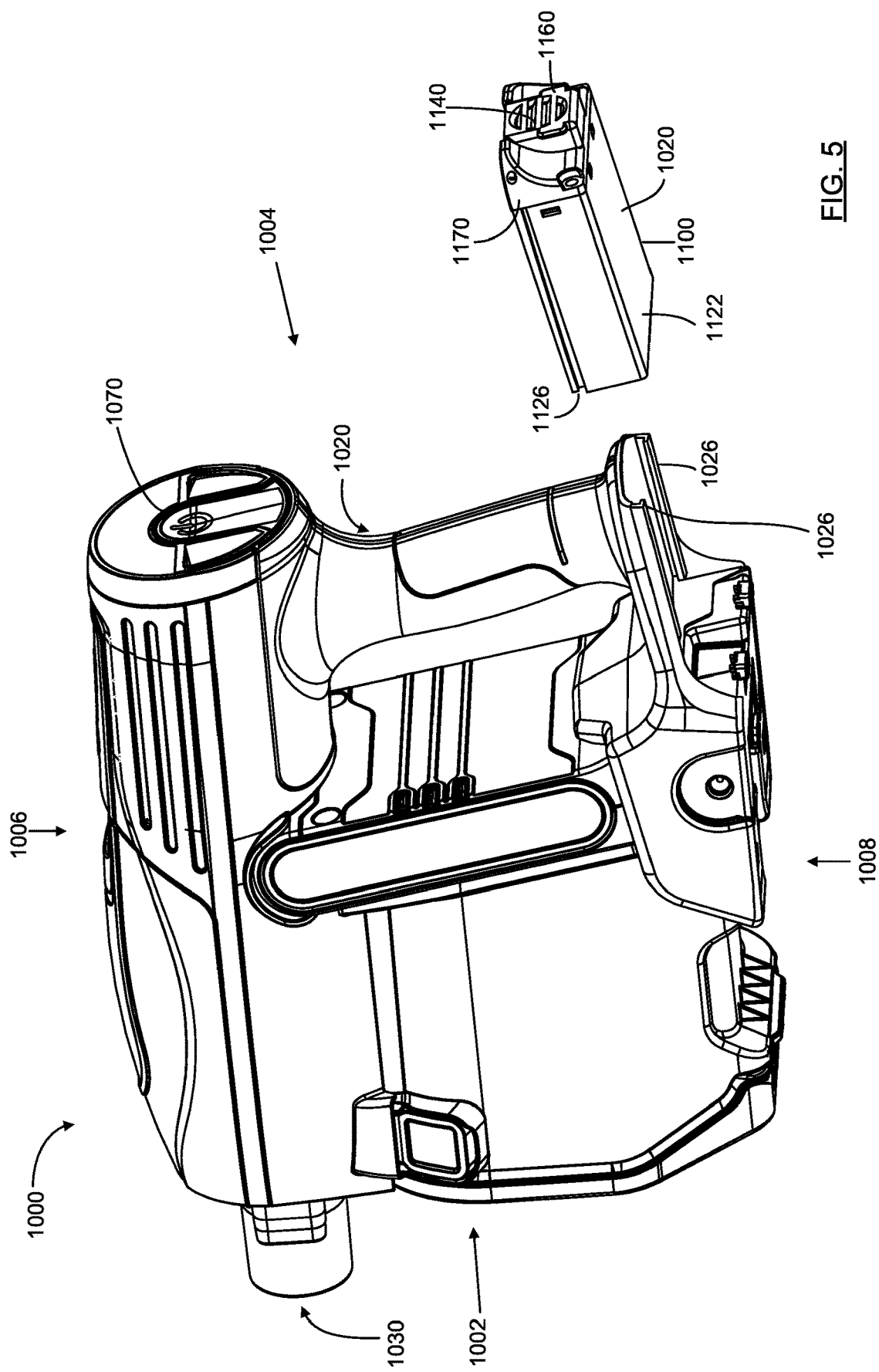
FIG. 5 is a bottom rear perspective view of the hand vacuum cleaner of FIG. 1 with the energy storage chamber fully removed.
Figure 6:
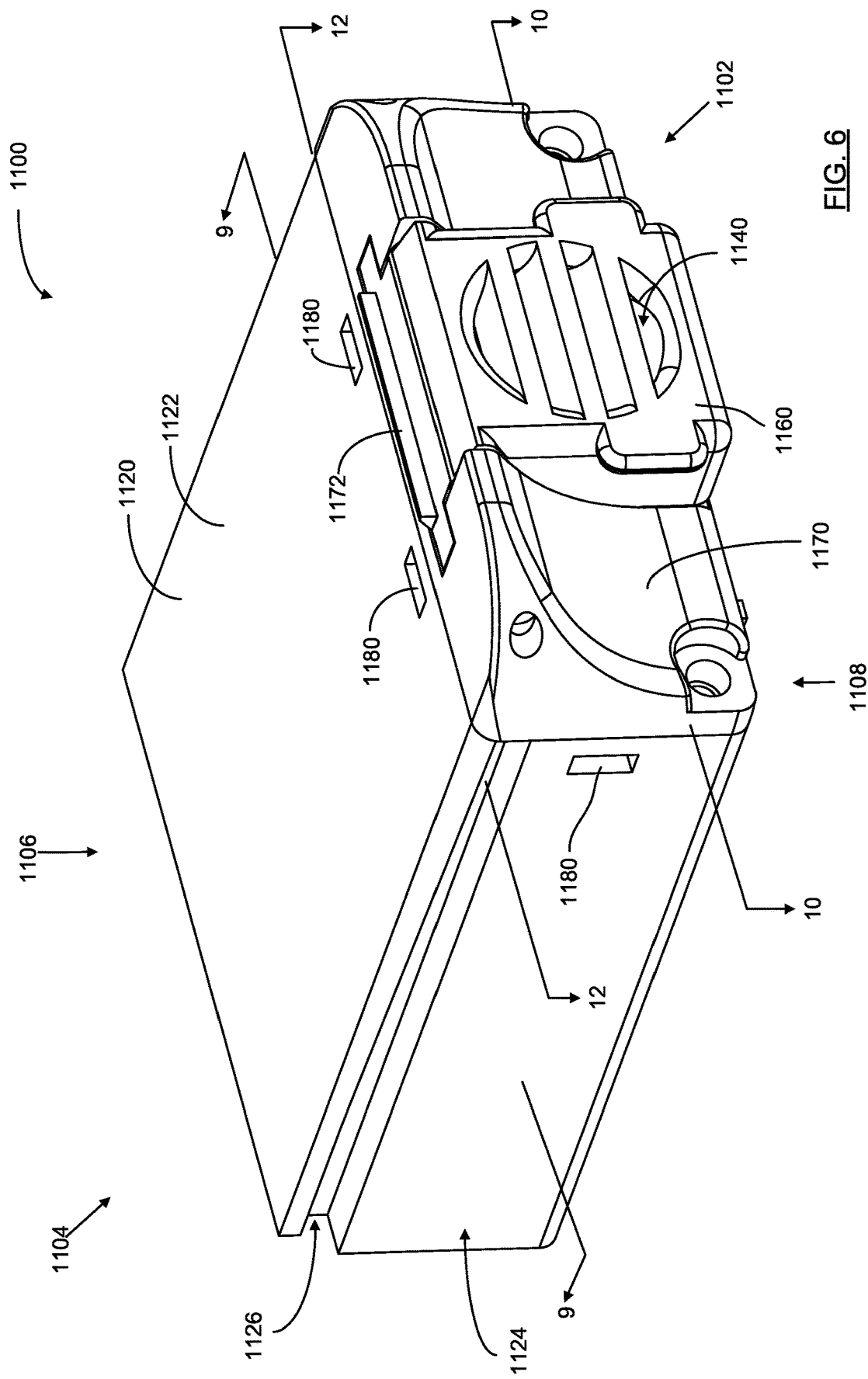
FIG. 6 is a top front perspective view of an energy storage chamber for a hand vacuum cleaner in accordance with an embodiment.
Figure 7:
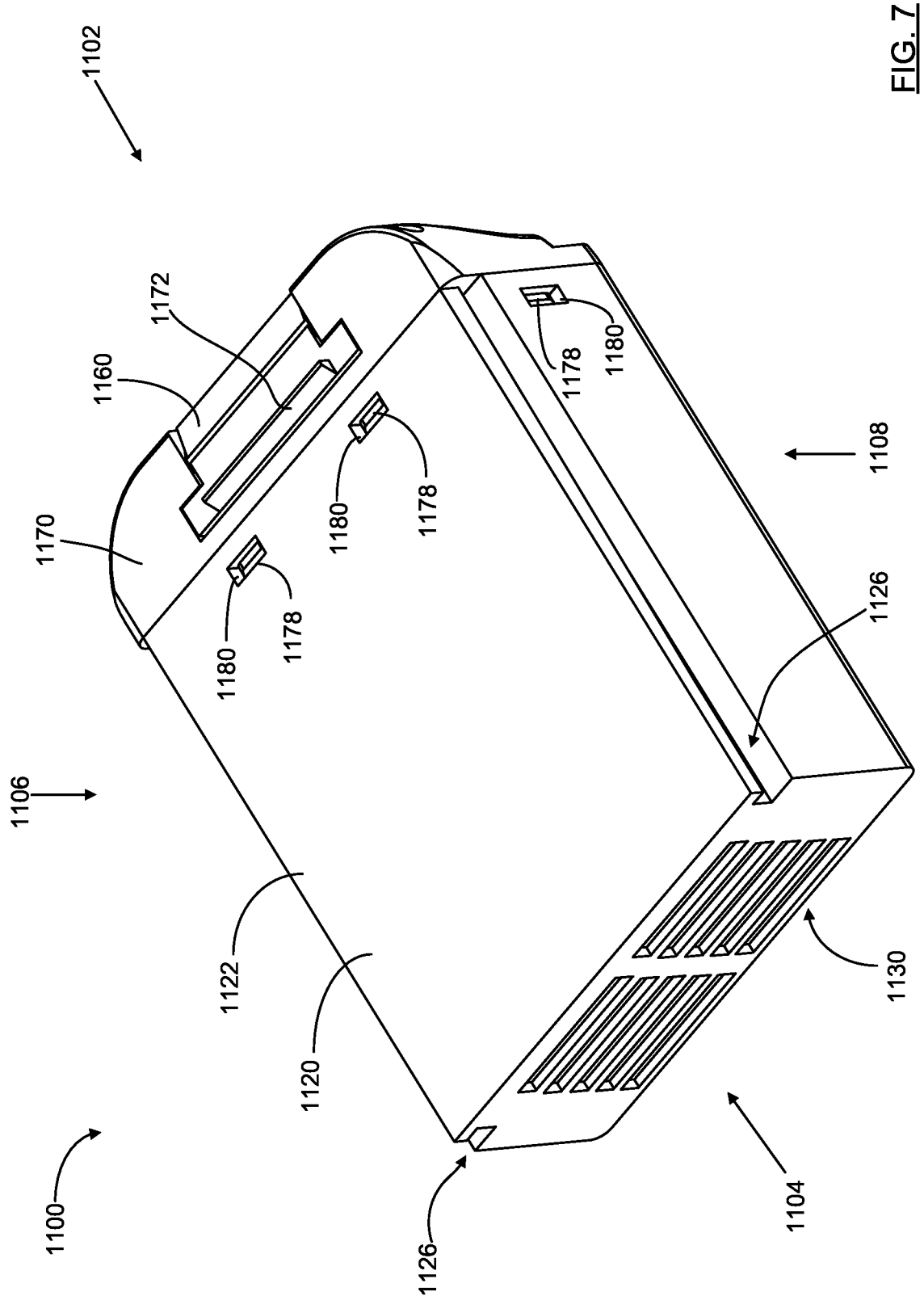
FIG. 7 is a top rear perspective view of the energy storage chamber of FIG. 6.
Figure 8:
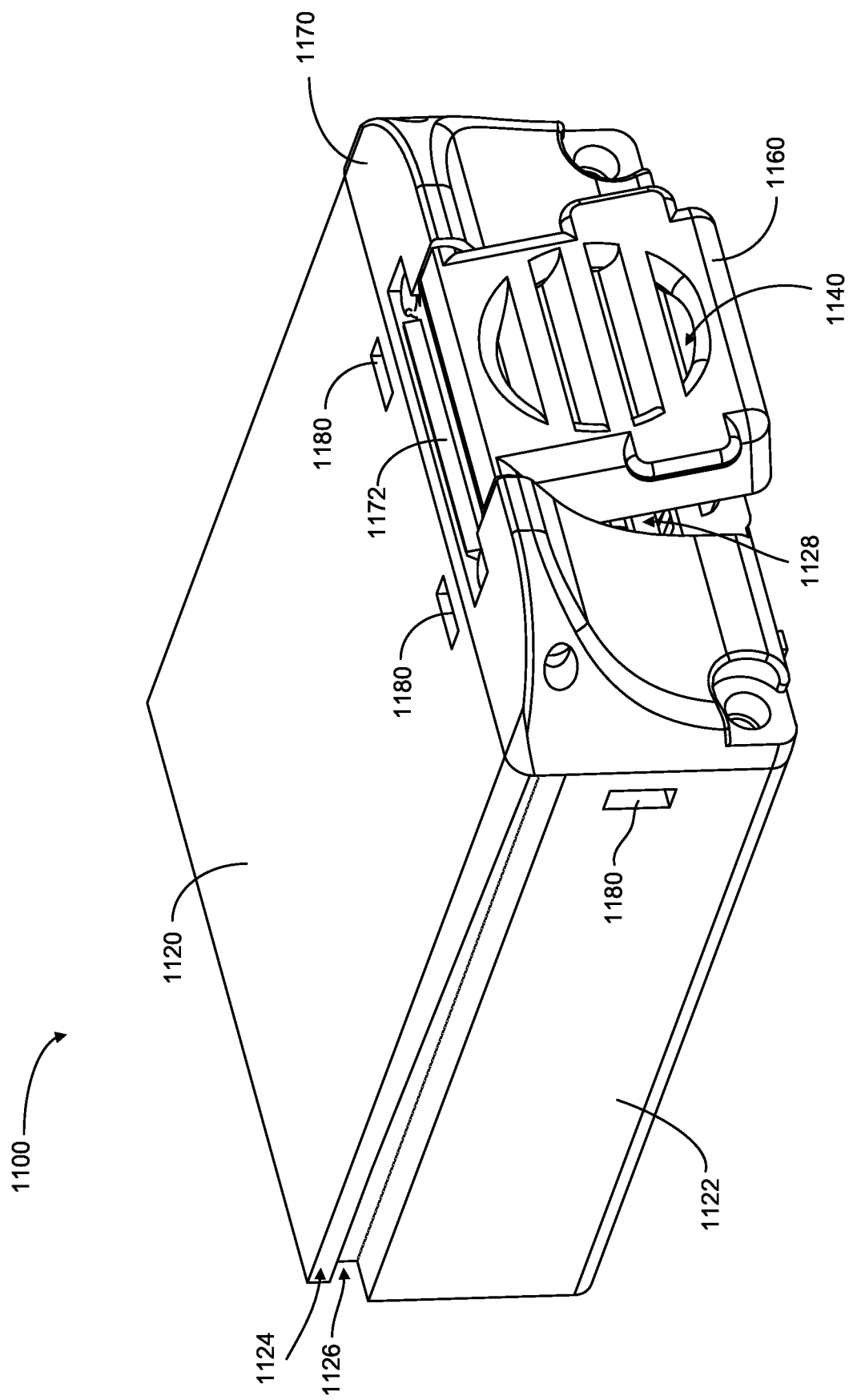
FIG. 8 is a front perspective view of the energy storage chamber of FIG. 6 with a latch member in a partially open position.

Optionally, as shown in FIGS. 3-5, the battery pack 1100 may be removable from the rest of the hand vacuum cleaner 1000 using any mechanism known in the art. In alternative embodiments, the energy storage chamber 1100 may be fixed to the main body 1010 and may not be removable.

Any mounting members for enabling a battery pack to be removably mounted may be used. As exemplified, the battery pack 1100 can be removed from the hand vacuum cleaner 1000 by sliding the battery pack 1100 along a track provided in the bottom rear portion of the main body 1010. The main body 1010 has a pair of battery pack mounting members 1026 arranged to receive the battery pack 1100. The battery pack 1100 has a corresponding pair of main body engagement members 1126 (dovetail recesses) that are engagable with the mounting members 1026. The engagement members 1126 and mounting members 1026 may form corresponding elements of a dovetail joint. The battery pack 1100 can be mounted to, or removed from, the main body 1010 by sliding the engagement members 1126 along the mounting members 1026.

As exemplified, the engagement members 1126 can be recessed into the outer perimeter 1124 of the housing 1120. That is, the engagement members 1126 may define a recessed portion of the housing 1120 that extends inwards from the outer face 1124 of the housing 1120. Alternatively, the engagement members 1126 may be flush with or extend from the perimeter 1124 of the housing 1120.

Figure 9:
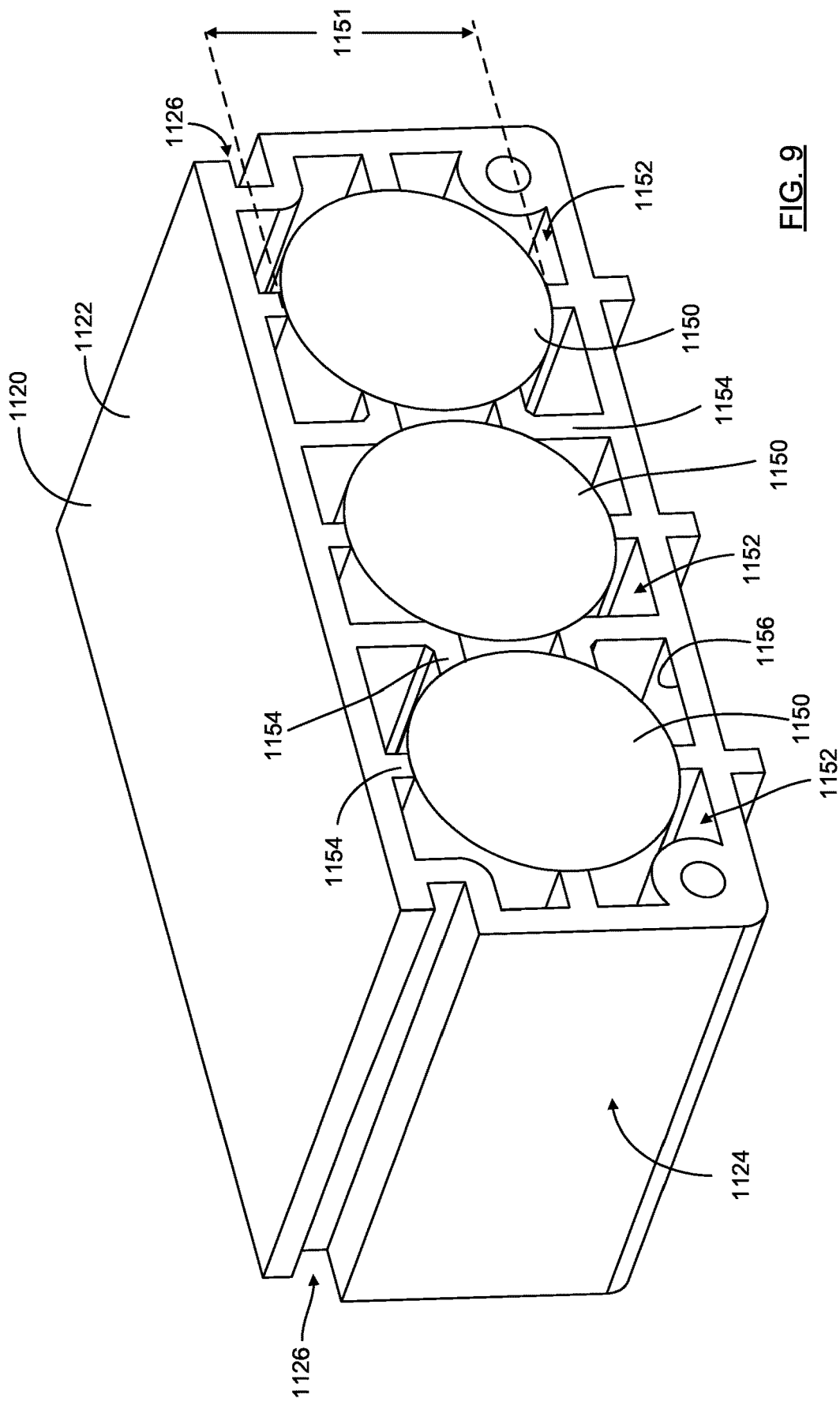
FIG. 9 is a perspective sectional view of the energy storage chamber of FIG. 6, taken along line 9-9 in FIG. 6.
Figure 10:
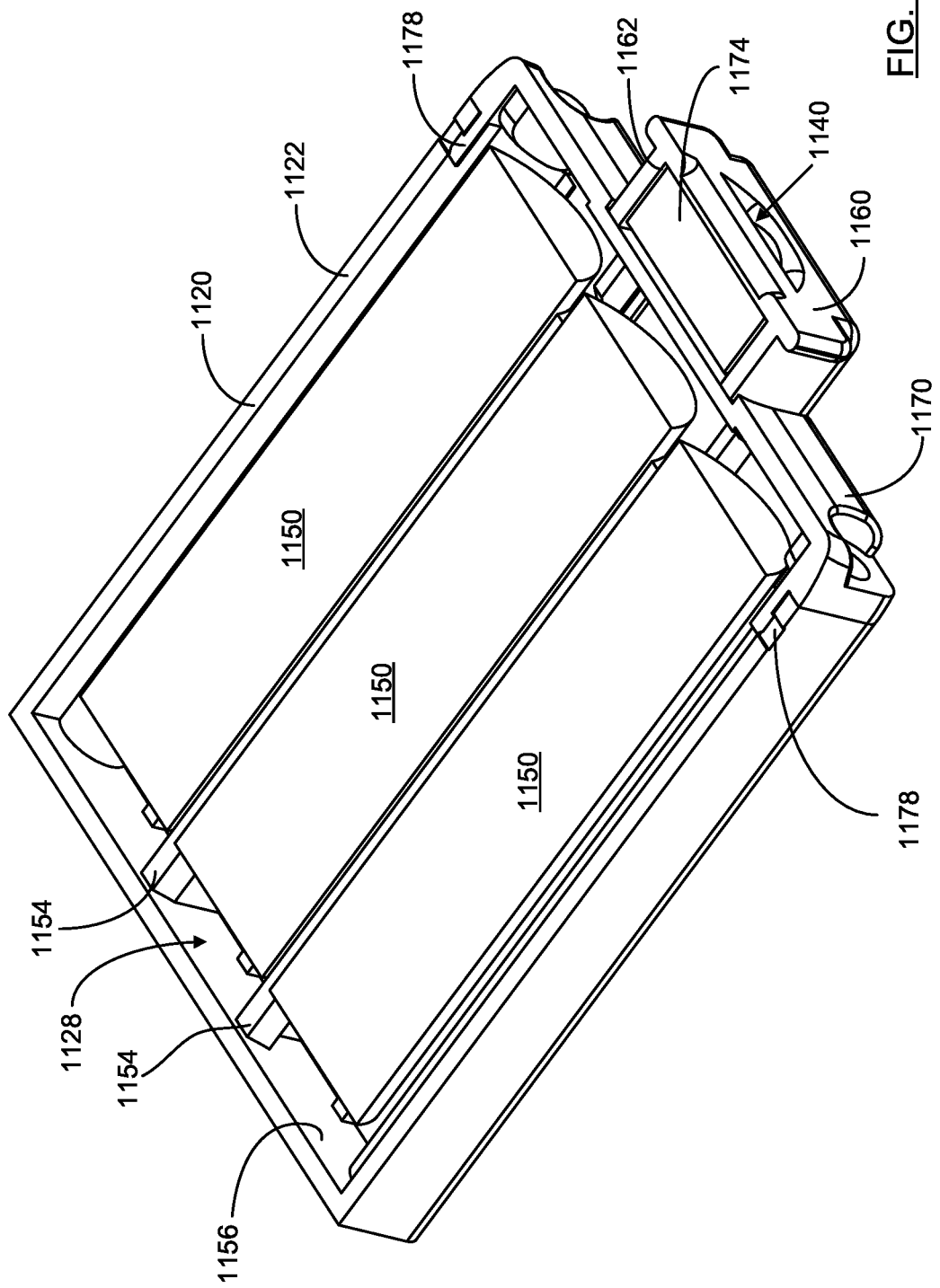
FIG. 10 is a perspective sectional view of the energy storage chamber of FIG. 6, taken along line 10-10 in FIG. 6.
Figure 11:
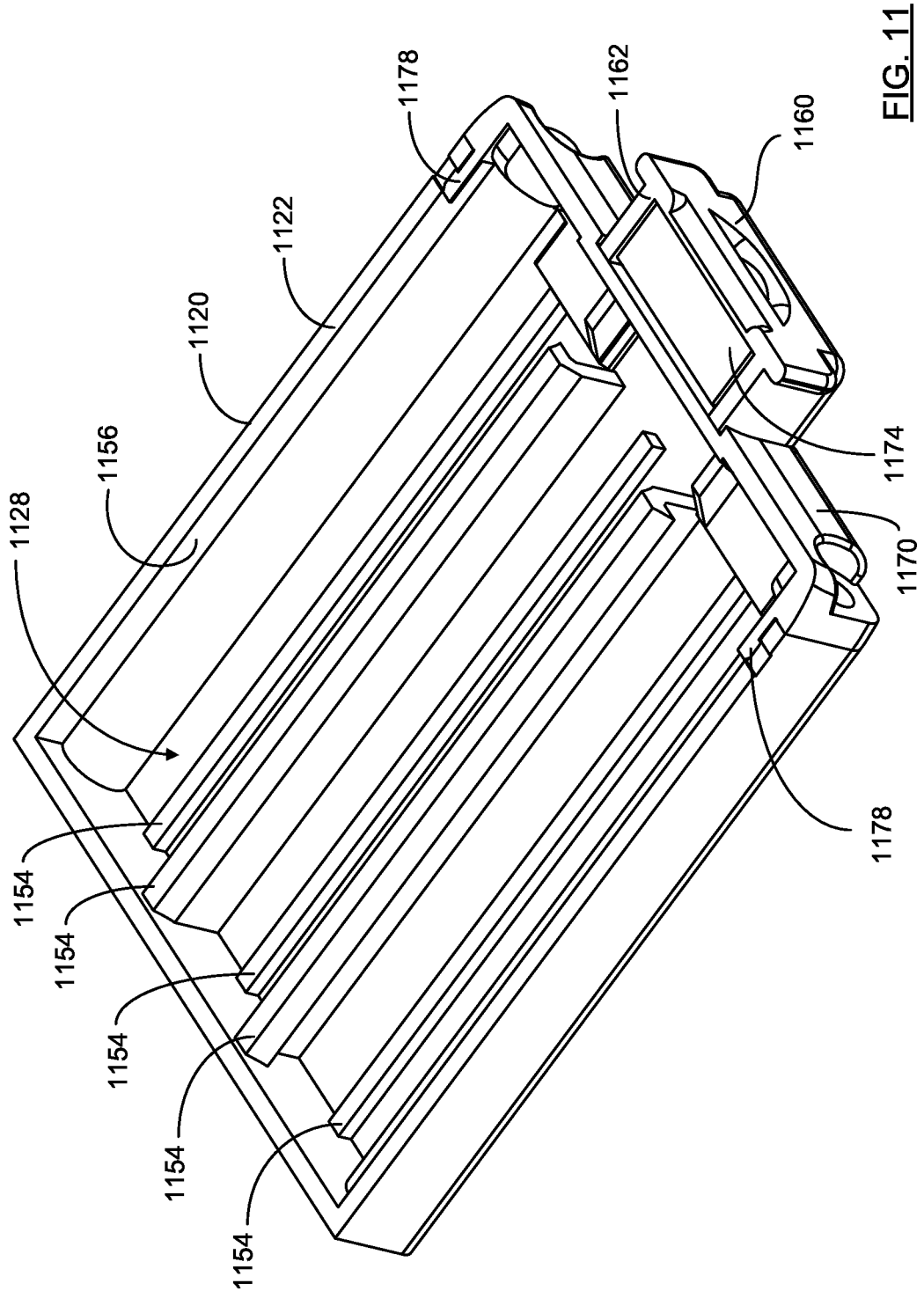
FIG. 11 is a perspective sectional view of the energy storage chamber of FIG. 6, taken along line 10-10 in FIG. 6 with the energy storage members removed.
Figure 12:
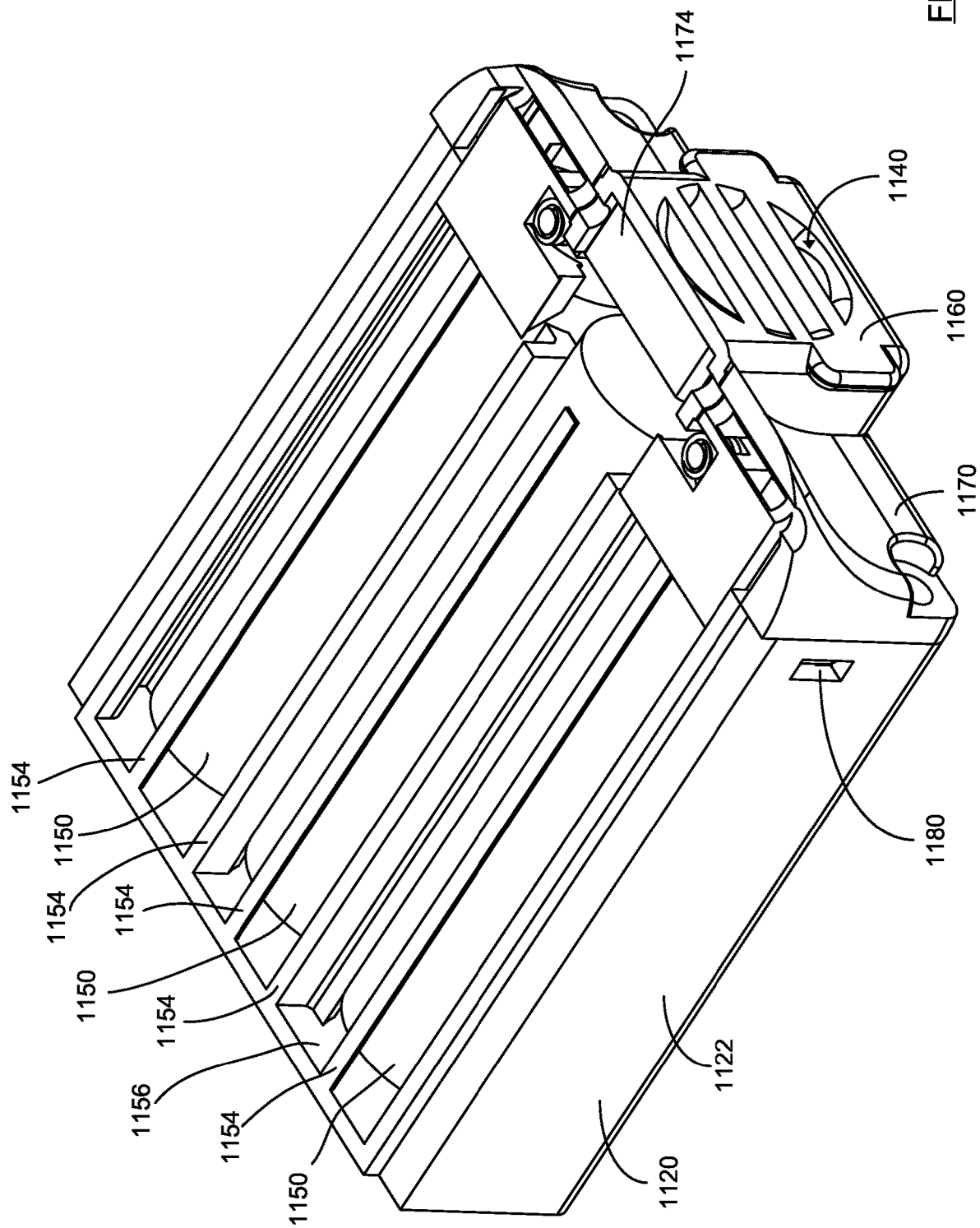
FIG. 12 is a perspective sectional view of the energy storage chamber of FIG. 6, taken along line 12-12 in FIG. 6.

In the example shown in FIG. 9, the recessed engagement members 1126 extend into the interior 1128 of the energy storage chamber 1100. The engagement members 1126 may extend into the energy storage chamber 1100 at least partially within the height of the batteries 1150. By extending into the interior 1128, the engagement members 1126 may reduce the volume of the air flow channels 1152. However, recessing the engagement members 1126 may provide a more compact overall form for the energy storage chamber 1100.

The hand vacuum cleaner 1000 may also include a battery pack lock to secure the energy storage chamber 1100 to the main body 1010. In the example shown, the energy storage chamber 1100 includes a lock member 1172 provided on the top of battery release unit 1160. The lock member 1172 may be a latch that protrudes out of the perimeter of the housing 1120. The main body 1010 has a corresponding engagement region 1028. The lock member 1172 may extend into the engagement region 1028 and prevent the energy storage chamber 1100 from being removed from the hand vacuum cleaner 1000.

Figure 13B:
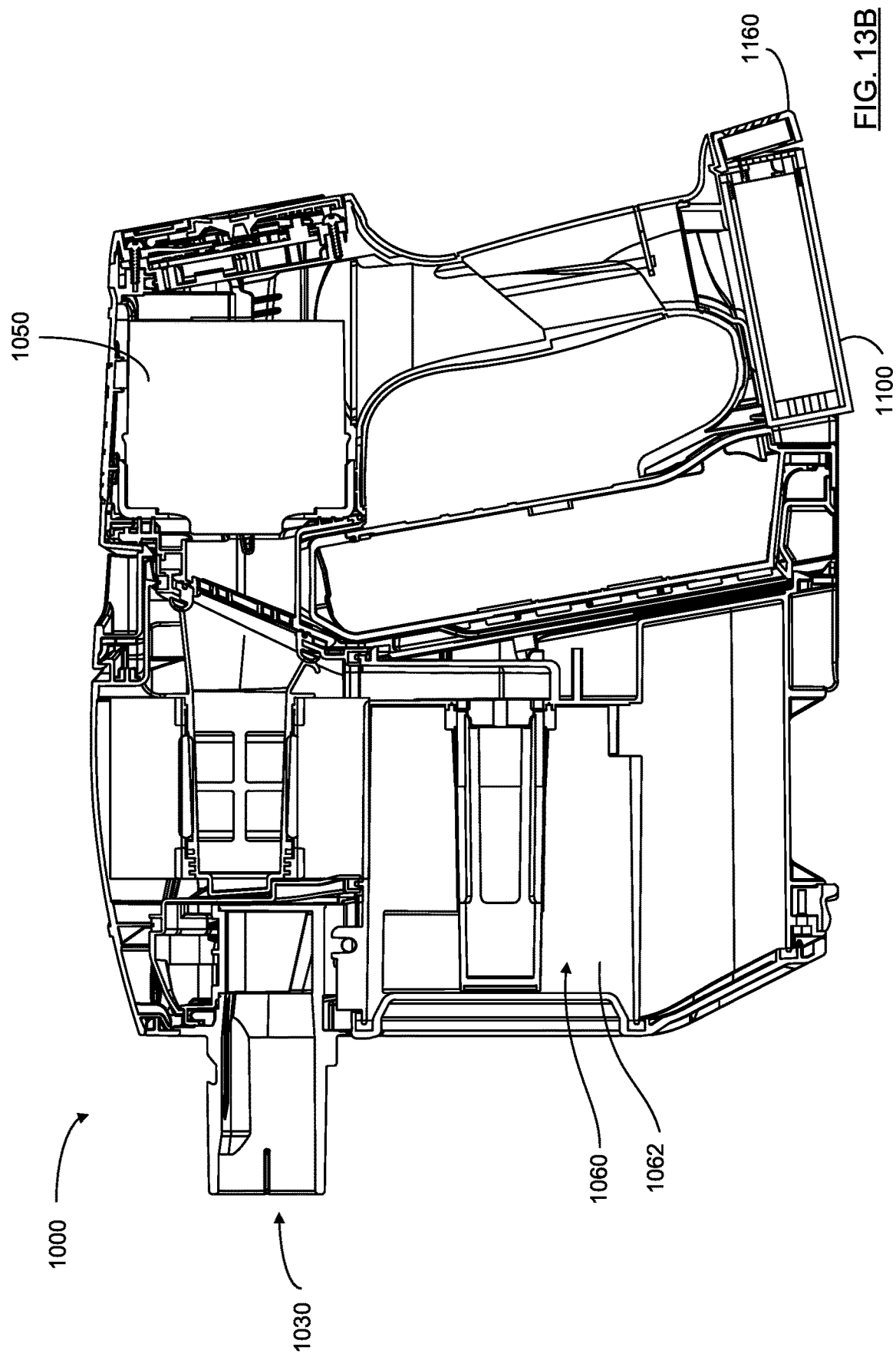
FIG. 13B is a cross-section view of the hand vacuum cleaner of FIG. 1, taken along line 13-13 in FIG. 1, showing the front portion of the energy storage chamber in an unlocked position.
Figure 13C:
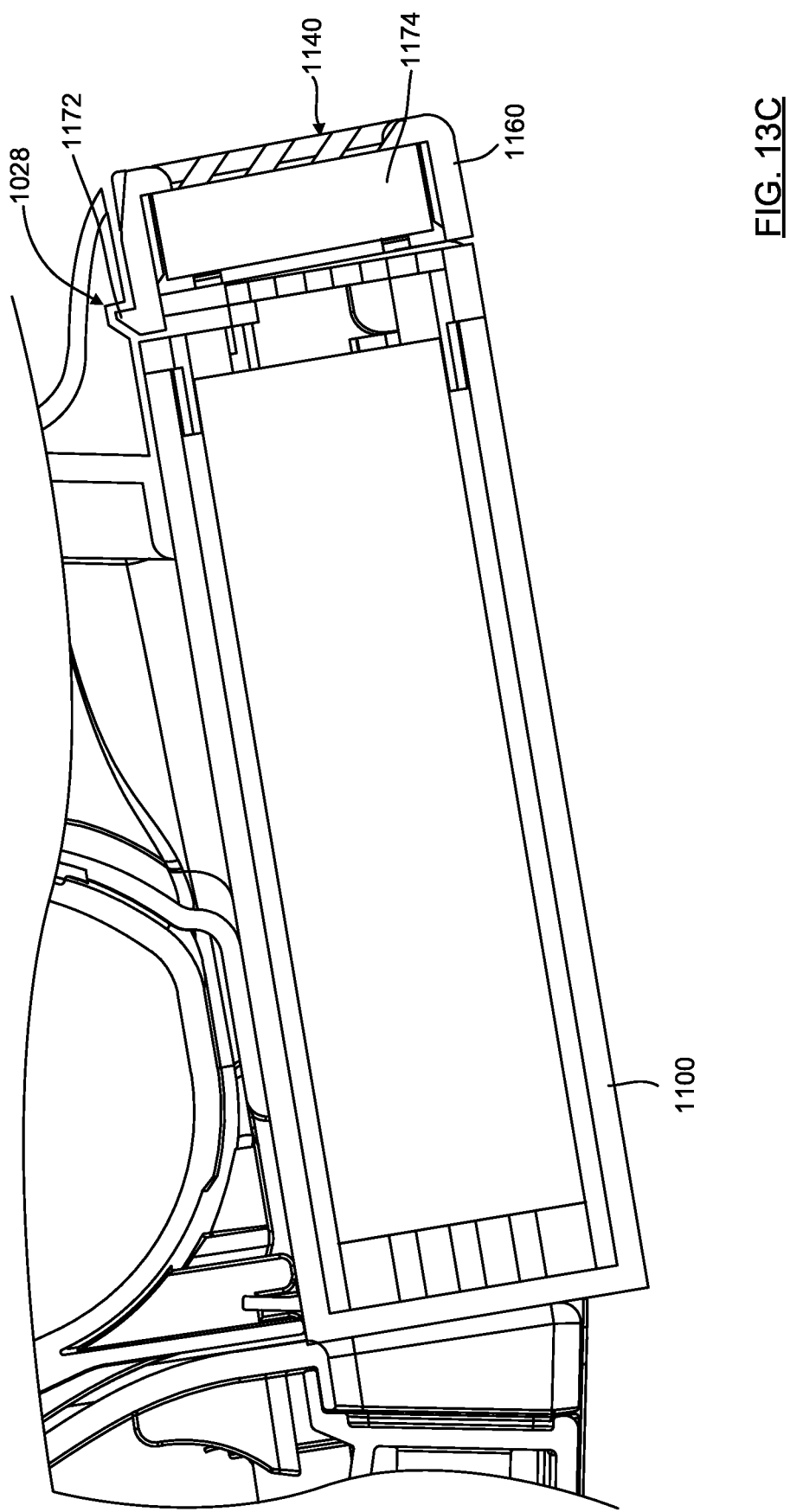
FIG. 13C is an enlarged view of the lower right portion of FIG. 13A.
Figure 13D:
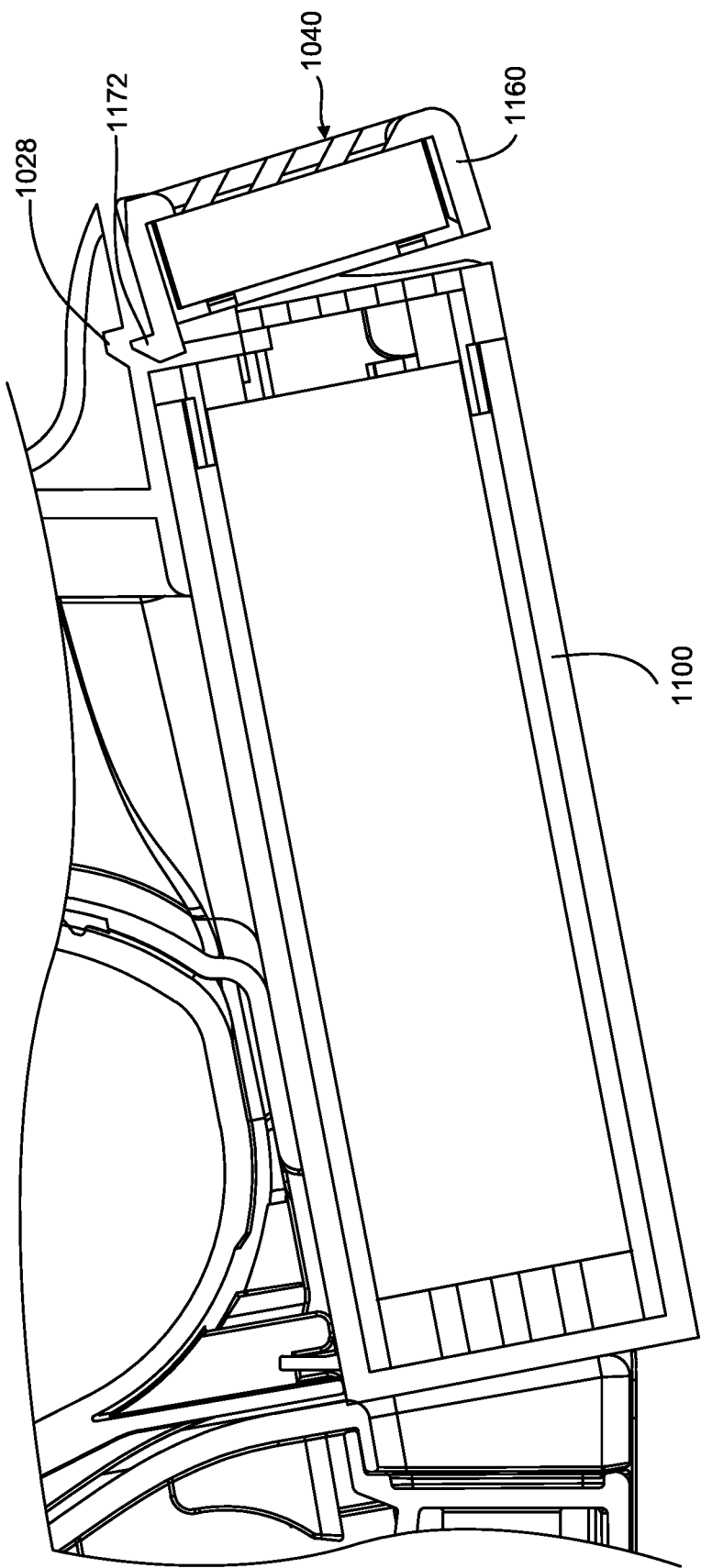
FIG. 13D is an enlarged view of the lower right portion of FIG. 13B.

The lock member 1172 may be moveable between a locked position (see FIGS. 6 and 7) in which the lock member 1172 extends above the surface of the housing 1120 and an unlocked position (see FIG. 8) in which the lock member 1172 recedes into a recess of the front portion 1170. To move the lock member 1172 between the locked and unlocked position, the battery release unit 1160 may be rotated slightly. In the example shown, the battery release unit 1160 may be rotated by an angle of about 7 degrees or so to transition the lock member 1172 from the locked position to the unlocked position. As shown in FIGS. 13A and 13C, when the battery pack 1100 is mounted to the main body 1010 and the lock member 1172 is in the locked position, the lock member 1172 is received in the engagement region 1028. The lock member 1172 and engagement region 1028 can thus prevent the battery pack 1100 from being slid off the main body 1010. When the lock member 1172 is moved to the unlocked position (see FIGS. 13B and 13D) the battery pack 1100 can be slid off the main body 1010, since the lock member 1172 no longer contacts the engagement region 1028.

The battery release unit 1160 may be biased to the locked position. A user may adjust the release unit 1160 to the unlocked position in order to remove the battery pack 1100. The battery release unit 1160 may be openably connected (e.g., pivotally openable or removably mounted) to the rest of the energy storage chamber using any suitable mechanism, including a hinge or other suitable device. A user may move the release unit 1160 to the unlocked position by grasping the underside of the release unit 1160 and rotating it to move the lock member 1172 to the unlocked position. Optionally, the battery release unit 1160 may be secured in the closed position using any suitable type of locking mechanism, including a latch mechanism that may be released by a user.

In the embodiment of FIGS. 6 to 13, the battery release unit 1160 may be opened by pivoting it about a hinge assembly from the locked/closed position to the unlocked/open position. The battery release unit 1160 may be secured in the closed position by a friction fit, and/or by a latch member or other suitable locking mechanism. Preferably, the battery release unit 1160 may include at least one release actuator so that a user may unlock the latch member 1172 or release unit 1160 from the closed position, e.g. by depressing the actuator.

In some embodiments, the battery release unit 1160 may also enclose the fan unit 1174. For example, the battery release unit 160 may comprise or consist of the fan unit housing. The battery release unit 1160 may define a fan housing 1162 that provides a receiving space for the fan unit 1174. By mounting the fan unit 1174 in the release unit 1160, the fan unit 1174 can be positioned outside of the main body 1122 of the energy storage chamber 1100. At the same time, the fan housing 1162 may act as a finger guard to prevent a user from accidentally contacting the fan unit 1174 in operation.

This may reduce the size of the main body 1122, e.g. to provide a more compact form for instances when the fan unit 1174 may be omitted. Additionally, this allows the fan unit 1174 to be positioned apart from, and downstream of, the batteries 1150 in the energy storage chamber 1100.

It will be appreciated that a filter may be provided at the air inlet and/or the air outlet of the second airflow path.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A surface cleaning apparatus having a front end, a rear end, an upper end, a lower end, and first and second laterally spaced apart sides, and comprising:
    (a) a first airflow path extending from a dirty air inlet to a clean air outlet;
    (b) an air treatment member positioned in the airflow path and having an air treatment member air inlet and an air treatment member air outlet;
    (c) a suction motor positioned in the airflow path upstream of the clean air outlet;
    (d) a second airflow path extending from an ambient air inlet to a secondary air outlet, wherein the second airflow path is fluidically isolated from the first airflow path;
    (e) an energy storage chamber having at least one energy storage member wherein the energy storage chamber is positioned in the second air flow path;
    and,
    (f) a fan unit positioned in the second airflow path upstream of the secondary air outlet,
    wherein, in operation, the fan unit draws ambient air into the second air flow path via the ambient air inlet.

2. The surface cleaning apparatus of claim 1 wherein the energy storage chamber is thermally isolated from the first air flow path.

3. The surface cleaning apparatus of claim 1 further comprising a control system capable of detecting an operating condition of the surface cleaning apparatus and then selectively activating the fan unit based on the operating condition.

4. The surface cleaning apparatus of claim 3, wherein the operating condition is a charging status of the at least one energy storage member, and the control system is operable to activate the fan unit when the at least one energy storage member is charging.

5. The surface cleaning apparatus of claim 1, wherein the fan unit is actuated when the suction motor is actuated.

6. The surface cleaning apparatus of claim 3 wherein the operating condition is a temperature of the at least one energy storage member, and the control system is operable to activate the fan unit when the temperature of the at least one storage member exceeds a predefined threshold temperature.

7. The surface cleaning apparatus of claim 3, further comprising a temperature sensor positioned to measure a temperature of the at least one energy storage member, and the control system is operable to activate the fan unit when the measured temperature exceeds a predefined threshold temperature.

8. The surface cleaning apparatus of claim 1, further comprising a filter positioned in the second air flow path at the ambient air inlet.

9. The surface cleaning apparatus of claim 1, further comprising a control system capable of controlling an operating condition of the surface cleaning apparatus, wherein the control system is in fluid contact with the second air flow path.

10. The surface cleaning apparatus of claim 1, wherein
    (a) the surface cleaning apparatus comprises a main body and the energy storage chamber is removably mounted to the main body;
    (b) the energy storage chamber comprises a moveable portion having an engagement member, the engagement member being moveable between a locked position and an unlocked position, wherein when the energy storage chamber is mounted to the main body and the engagement member is in the locked position the engagement member prevents the energy storage chamber being removed from the main body and when the energy storage chamber is mounted to the main body and the engagement member is in the unlocked position the energy storage member is removable from the main body; and, (c) the moveable portion defines a fan unit housing enclosing the fan unit.

11. A surface cleaning apparatus having a front end, a rear end, an upper end, a lower end, and first and second laterally spaced apart sides, and comprising:
   (a) a first airflow path extending from a dirty air inlet to a clean air outlet;
   (b) an air treatment member positioned in the airflow path and having an air treatment member air inlet and an air treatment member air outlet;
   (c) a suction motor positioned in the airflow path upstream of the clean air outlet;
   (d) a second airflow path extending from an ambient air inlet to a secondary air outlet;
   (e) an energy storage chamber having at least one energy storage member wherein the energy storage chamber is positioned in the second air flow path; and
   (f) a fan unit positioned in the second airflow path upstream of the secondary air outlet,
   wherein, in operation, the fan unit draws ambient air into the second air flow path via the ambient air inlet, and
   wherein the energy storage chamber comprises a moveable portion that defines a fan unit housing containing the fan unit.

12. The surface cleaning apparatus of claim 11, wherein the moveable portion has a locking member releasable securing the energy storage chamber in the surface cleaning apparatus.

13. The surface cleaning apparatus of claim 1, wherein the energy storage chamber comprises a fan unit housing containing the fan unit and the fan unit housing has a locking member releasably securing the energy storage chamber in the surface cleaning apparatus.

14. The surface cleaning apparatus of claim 1, wherein an exterior surface of the at least one energy storage member is free of an electrically insulating coating.

15. The surface cleaning apparatus of claim 1, wherein the energy storage chamber comprises a housing manufactured of a thermally conductive plastic.

16. A surface cleaning apparatus having a front end, a rear end, an upper end, a lower end, and first and second laterally spaced apart sides, and comprising:

(a) a first airflow path extending from a dirty air inlet to a clean air outlet;
(b) an air treatment member positioned in the airflow path and having an air treatment member air inlet and an air treatment member air outlet;
(c) a suction motor positioned in the airflow path upstream of the clean air outlet;
(d) a second airflow path extending from an ambient air inlet to a secondary air outlet;
(e) an energy storage chamber having at least one energy storage member wherein the energy storage chamber is positioned in the second air flow path; and
(f) a fan unit positioned in the second airflow path upstream of the secondary air outlet,
wherein, in operation, the fan unit draws ambient air into the second air flow path via the ambient air inlet, and
wherein the energy storage chamber comprises a housing defining an outer perimeter of the energy storage chamber and the housing is slideable is mountable to a main body of the surface cleaning apparatus.

17. A surface cleaning apparatus having a front end, a rear end, an upper end, a lower end, and first and second laterally spaced apart sides, and comprising:
   (a) a first airflow path extending from a dirty air inlet to a clean air outlet;
   (b) an air treatment member positioned in the airflow path and having an air treatment member air inlet and an air treatment member air outlet;
   (c) a suction motor positioned in the airflow path upstream of the clean air outlet;
   (d) a second airflow path extending from an ambient air inlet to a secondary air outlet;
   (e) an energy storage chamber having at least one energy storage member wherein the energy storage chamber is positioned in the second air flow path; and,
   (f) a venturi connecting the first and second airflow paths whereby airflow through the first airflow path draws air through the second air flow path.

18. The surface cleaning apparatus of claim 15 wherein the secondary air outlet is positioned downstream of the at least one energy storage member.

19. The surface cleaning apparatus of claim 16 wherein the energy storage chamber has a dovetail recess that is recessed inward of the outer perimeter of the energy storage chamber and, the energy storage chamber is mountable to a main body of the surface cleaning apparatus by the dovetail recess.

* * * * *